(12) United States Patent
Darnell et al.

(10) Patent No.: US 8,694,607 B2
(45) Date of Patent: Apr. 8, 2014

(54) RECURSIVE SUBSCRIPTIONS TO CONTENT FEEDS

(75) Inventors: Benjamin G. Darnell, Palo Alto, CA (US); Carl Laurence Gonsalves, Atherton, CA (US); Justin Christopher Haugh, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1139 days.

(21) Appl. No.: 11/869,503

(22) Filed: Oct. 9, 2007

(65) Prior Publication Data

US 2008/0086755 A1     Apr. 10, 2008

Related U.S. Application Data

(60) Provisional application No. 60/828,613, filed on Oct. 6, 2006.

(51) Int. Cl.
  *G06F 15/16*     (2006.01)

(52) U.S. Cl.
  USPC .......................................... 709/218; 725/105

(58) Field of Classification Search
  USPC ....................................................... 709/218
  See application file for complete search history.

(56) References Cited

U.S. PATENT DOCUMENTS

| | | | |
|---|---|---|---|
| 5,872,921 A | 2/1999 | Zahariev et al. | |
| 6,138,147 A | 10/2000 | Weaver et al. | |
| 6,148,330 A * | 11/2000 | Puri et al. | 709/217 |
| 6,154,752 A | 11/2000 | Ryan | |
| 6,587,127 B1 | 7/2003 | Leeke et al. | |
| 6,701,350 B1 | 3/2004 | Mitchell | |
| 6,831,667 B1 | 12/2004 | Russin et al. | |
| 7,047,502 B2 | 5/2006 | Petropoulos et al. | |
| 7,149,353 B2 | 12/2006 | Siegel et al. | |
| 7,293,019 B2 | 11/2007 | Dumais et al. | |
| 7,360,167 B2 | 4/2008 | Hennum et al. | |
| 7,383,266 B2 | 6/2008 | Stewart et al. | 707/100 |
| 7,581,166 B2 | 8/2009 | Renger et al. | |
| 7,590,691 B2 | 9/2009 | Gonsalves et al. | |
| 7,665,036 B1 | 2/2010 | Lin et al. | |
| 7,770,130 B1 | 8/2010 | Kaptelinin | |
| 7,818,659 B2 | 10/2010 | Kahn et al. | |

(Continued)

FOREIGN PATENT DOCUMENTS

CN         1473301 A       2/2004

OTHER PUBLICATIONS

"GettingStartedRojo," 6 pages, Nov. 27, 2005, http://web.archive.org/web/20051127084615/rojo.jot.com/GettingStartedRojo.

(Continued)

*Primary Examiner* — Maceeh Anwari
(74) *Attorney, Agent, or Firm* — Morgan, Lewis & Bockius LLP

(57) ABSTRACT

At a client device, a user subscribes to a specified stream, where the specified stream includes one or more other streams. A respective stream of the one or more other streams includes two or more content feeds, and each content feed includes a set of content items published by a respective publication source. The client devices presents to the user (e.g., on a display of the client device) content items associated with the specified stream. In some embodiments, streams can be recursively defined to include combinations of other streams, and users who subscribe to a recursively defined stream receive content items from the content feeds associated with that stream.

23 Claims, 24 Drawing Sheets

(56) References Cited

U.S. PATENT DOCUMENTS

| | | | |
|---|---|---|---|
| 7,865,830 | B2 | 1/2011 | Kim et al. |
| 2002/0004821 | A1 | 1/2002 | Togawa et al. |
| 2002/0096563 | A1 | 7/2002 | Singhal |
| 2002/0165881 | A1 | 11/2002 | Shelton |
| 2003/0097453 | A1 | 5/2003 | Fuchigami et al. |
| 2004/0204128 | A1 | 10/2004 | Zakharia et al. |
| 2005/0021680 | A1 | 1/2005 | Ekis et al. |
| 2005/0033657 | A1 | 2/2005 | Herrington et al. ............ 705/26 |
| 2005/0114790 | A1 | 5/2005 | Dunbar et al. |
| 2005/0131866 | A1 | 6/2005 | Badros et al. |
| 2005/0132067 | A1 | 6/2005 | Bennett et al. |
| 2005/0135361 | A1 | 6/2005 | Lim et al. |
| 2005/0188320 | A1 | 8/2005 | Bocking |
| 2005/0193010 | A1* | 9/2005 | DeShan et al. ............ 707/104.1 |
| 2005/0289468 | A1 | 12/2005 | Kahn et al. .................... 715/738 |
| 2006/0002317 | A1 | 1/2006 | Punaganti Venkata |
| 2006/0015651 | A1 | 1/2006 | Freimuth et al. |
| 2006/0031335 | A1 | 2/2006 | Carey |
| 2006/0059225 | A1 | 3/2006 | Stonehocker et al. |
| 2006/0073812 | A1 | 4/2006 | Punaganti Venkata et al. ......................... 455/412.1 |
| 2006/0095507 | A1 | 5/2006 | Watson |
| 2006/0112076 | A1 | 5/2006 | Burris et al. ...................... 707/3 |
| 2006/0155698 | A1 | 7/2006 | Vayssiere |
| 2006/0167860 | A1 | 7/2006 | Eliashberg et al. |
| 2006/0173985 | A1 | 8/2006 | Moore ......................... 709/223 |
| 2006/0265503 | A1 | 11/2006 | Jones et al. |
| 2006/0279799 | A1 | 12/2006 | Goldman |
| 2006/0282822 | A1 | 12/2006 | Weng |
| 2006/0288011 | A1 | 12/2006 | Gandhi et al. |
| 2007/0016609 | A1 | 1/2007 | Kim et al. |
| 2007/0027865 | A1 | 2/2007 | Bartz et al. |
| 2007/0060136 | A1 | 3/2007 | Ramer et al. |
| 2007/0061333 | A1 | 3/2007 | Ramer et al. |
| 2007/0078884 | A1 | 4/2007 | Ott, IV et al. |
| 2007/0094390 | A1 | 4/2007 | Nussey |
| 2007/0100959 | A1 | 5/2007 | Eichstaedt et al. |
| 2007/0100978 | A1 | 5/2007 | Levi et al. |
| 2007/0130589 | A1 | 6/2007 | Davis et al. |
| 2007/0159651 | A1 | 7/2007 | Disario et al. |
| 2007/0162842 | A1 | 7/2007 | Ambachtsheer et al. |
| 2007/0168522 | A1 | 7/2007 | Van Valen, III |
| 2007/0174487 | A1 | 7/2007 | Busey ........................... 709/246 |
| 2007/0192318 | A1 | 8/2007 | Ramer et al. |
| 2007/0203906 | A1 | 8/2007 | Cone et al. |
| 2007/0226207 | A1 | 9/2007 | Tawde |
| 2007/0240041 | A1 | 10/2007 | Pearson |
| 2007/0244901 | A1 | 10/2007 | Mohler et al. |
| 2007/0271202 | A1 | 11/2007 | O'Connor |
| 2008/0010337 | A1 | 1/2008 | Hayes et al. |
| 2008/0013266 | A1 | 1/2008 | Yamada et al. |
| 2008/0046459 | A1 | 2/2008 | Hinohara |
| 2008/0052742 | A1 | 2/2008 | Kopf et al. |
| 2008/0117911 | A1 | 5/2008 | Rajakarunanayake et al. |
| 2008/0126476 | A1 | 5/2008 | Nicholas et al. |
| 2008/0155118 | A1 | 6/2008 | Glaser et al. |
| 2008/0214155 | A1 | 9/2008 | Ramer et al. |

OTHER PUBLICATIONS

"Rojo's Frequently Asked Questions (FAQ)," 13 pages, Dec. 2, 2005, http://web.archive.org/web/20051202045411/rojo.jot.com/FAQ.

"Rojo Tour," 27 pages, Aug. 1, 2005, http://web.archive.org/web/20050801014123/rojo.jot.com/RojoTour.

Hammersley, B., "Content Syndication with RSS," Chapter 10, [Online] Mar. 2003, O'Reilly, USA, [retrieved on Jan. 15, 2007, http://safari.oreilly.com/0596003838.

Jarrett, A.C., "NusEye: Designing for Social Navigation in Syndicated Content," Proceedings of the 2005 Conference on Diversity in Computing, Albuquerque, New Mexico, Oct. 19, 2005, pp. 17-19.

Nottingham, N., et al., "The Atom Syndication Format," The Internet Society, Aug. 15, 2005, http://www.ietf.org/internet-drafts/draft-ieft-atompub-format-11.txt.

Paterson, C., "Feeding Time," Personal Computer World, vol. 27, No. 2, Feb. 2004, pp. 101-104.

Winer, D., "RSS 2.0 Specification," Jan. 30, 2005, http://blogs.law.harvard.edu/tech/rss.

Adachi, Implementation of Bookmark with Categorization and Metadata, Proceedings of 67th National Convention in 2005(3) Database and Media, Network, Japan, Information Processing Society of Japan, Mar. 2, 2005, pp. 3-137 to 3-138.

Amazon.com: buying info: Let It Be [soundtrack] screenshot from Wayback Machine, Aug. 13, 2001, 7 pgs.

Blogger Buzz: Next Blog, Now With Less Spam!, Sep. 2, 2005, 2 pgs.

Cold, Using Really Simple Syndication (RSS) to Enhance Student Research, Jan. 2006, 4 pgs.

Flickr:Help:Photos, How do I upload my photos?, Feb. 28, 2007, 13 pgs.

Google, International Preliminary Report on Patentability, PCT/US06/39566, Mar. 25, 2010, 10 pgs.

Google, Office Action, Australian Patent Application 2006302318, Mar. 8, 2011, 2 pgs.

Google, Office Action, Canadian Patent Application 2624868, May 10, 2011, 3 pgs.

Google, Office Action, Chinese Patent Application 200780044075.8 Sep. 13, 2010, 8 pgs.

Google, Office Action, Chinese Patent Application 201110228972.2, Apr. 23, 2012, 12 pgs.

Google, Office Action, European Patent Application 07843545.0 Jul. 13, 2011, 5 pgs.

Google, Office Action, Japanese Patent Application 2008-534740, Dec. 19, 2011, 4 pgs.

Google, Supplementary European Search Report, European Patent Application 07843545.0, Oct. 11, 2010, 4 pgs.

Kennedy, Weblogs, Social Software, and New Interactivity on the Web, Psychiatric Services, vol. 55, No. 3, Mar. 2004, 3 pgs.

Martindale, Using Weblogs in Scholarship and Teaching, TechTrends, vol. 49, No. 2, 2005, 9 pgs.

Moreover, Creating a Custom Feed, Feb. 28, 2007, 3 pgs.

Moreover, Put Free headlines on your site—in any topic!, Feb. 28, 2007, 2 pgs.

Quick Online Tips, Check your feedburner RSS feed size, May 19, 2009, 4 pgs.

Rose, Cobra: Content-based Filtering and Aggregation of Blogs and RSS Feeds, Apr. 11-13, 2007, 19 pgs.

RSSOwl Elements: the main screen, Sep. 8, 2006, 1 pg.

Sifry, Sifry's Alerts, New Technorati Features: Favorites, and Readling Lists/OPML for Blog Finder, Feb. 21, 2006, 5 pgs.

Takizawa, An RSS Reader Based on Multiple User's Information, Proceedings of 67th National Convention in 2005(3) Database and Media, Network, Japan, Information Processing Society of Japan, Mar. 2, 2005, pp. 3-197 to 3-198, 6 pgs.

Technorati Favorites, Add a Favorite, Feb. 28, 2007, 3 pgs.

Apple Mail's Notification Badge Cracks a Joke, Hawk Wings, Nov. 27, 2005, 2 pgs.

Google Inc., Office Action, CN 201110228972.2, Dec. 14, 2012, 10 pgs.

Google Inc., Office Action, JP 2008-534740, Oct. 9, 2012, 6 pgs.

Guillep2k, New 'mark as read' feature behavior, Mar. 26, 2002, 8 pgs.

Parmar, Unread email in Outlook subfolders, Mar. 21, 2005, 3 pgs.

Rai, Using Bloglines (or How to keep up dwith dozens of blogs everyday), Apr. 25, 2005, 35 pgs.

Rowse, Bloglines add Keyboard Shortcuts—Hotkeys, Oct. 13, 2005, 7 pgs.

Trapani, Geek to Live: From Bloglines to Google Reader, Oct. 6, 2006, 5 pgs.

\* cited by examiner

User Subscription Table 625

| | Stream 1 630 Feed ID: URL1 | Stream2 632 Feed ID: URL2 | Stream3 634 Feed ID: User1:tech | Stream4 636 Feed ID: User2:friends | Stream5 638 Feed ID: User25:tech |
|---|---|---|---|---|---|
| 640 | | | | | |
| 642 User 1 | √ label:tech | √ label:tech | | | |
| User 2 | | | √ label:friends | | |
| User 3 | √ | | | √ | √ label:friends |
| 644 646 | | | | | |

Client1 / User1

1102
Apply a first label (Label1) to one or more content feeds
--> first stream

Client2 / User2

1104
Apply a second label (Label2) to one or more content feeds
--> second stream

Client3 / User3

1106
Apply a third label (Label3) to a first stream (User1:Label1) and a second stream (User2:Label2)
--> third stream 1108
Present to third user content items for the third stream, which includes content items of the first and second streams 1110
Present first stream identifier (User1:Label1) and second stream identifier (User2:Label2)

Figure 11

RECURSIVE SUBSCRIPTIONS TO CONTENT FEEDS

RELATED APPLICATIONS

This application claims priority to U.S. Provisional Patent Application No. 60/828,613, titled "Recursive Subscriptions to Content Feeds," filed Oct. 6, 2006, which is incorporated by reference herein in its entirety.

This application is related to the following U.S. Patent Applications, which are incorporated by reference herein in their entirety:

U.S. patent application Ser. No. 11/246,597, titled "Indirect Subscriptions to A User's Selected Content Feed Items," filed Oct. 7, 2005;

U.S. patent application Ser. No. 11/246,596, titled "Personalized Content Feed Suggestions Page," filed Oct. 7, 2005;

U.S. patent application Ser. No. 11/246,657, titled "Content Feed User Interface with Gallery Display of Same-Type Items," filed Oct. 7, 2005; and U.S. patent application Ser. No. 11/246,656, titled "Indirect Subscriptions to Top N Lists of Content Feeds," filed Oct. 7, 2005.

TECHNICAL FIELD

The disclosed embodiments relate generally to content syndication, and more particularly, to a content feed user interface with multiple modes for viewing content feed items.

BACKGROUND

Content syndication is growing in popularity as a way to distribute frequently updated information, such as news and blog postings, on the Internet. Using content syndication formats such as Really Simple Syndication (RSS), content providers can include content and/or links to such content in a content feed. Users may subscribe to these content feeds using an application known as a feed reader, content feed reader, feed aggregator or content feed aggregator. When the content feed is updated with new content items, the new content items are reflected in the user's reader.

A user may subscribe to many content feeds, with each feed listing multiple content items. Looking through a dense list of content items to locate items of interest can be a cumbersome task for the user.

Accordingly, there is a need for a more efficient manner of presenting content items to the user.

SUMMARY

In an aspect of the present invention, a method of providing content is performed at a client device. In the method, a user of the client device is subscribed to a specified stream. The specified stream includes one or more other streams. A respective stream of the one or more other streams includes two or more content feeds, and each content feed includes a set of content items published by a respective publication source. Content items associated with the specified stream are presented to the user.

In another aspect, a method of providing content includes, at a first client device, in response to instructions from a first user, applying a first label to a first stream. The first stream includes a second stream and a third stream. The second stream includes one or more content feeds to which a second client device applied a second label, and the third stream includes one or more content feeds to which a third client device applied a third label. A sequence of content items for the first stream is presented to the first user at the first client device. The sequence includes content items associated with the second stream and the third stream.

In another aspect, a client device for presenting content to a user includes memory, a display, one or more processors, and one or more programs stored in the memory and configured for execution by the one or more processors. The one or more programs include instructions for subscribing a user of the client device to a specified stream. The specified stream includes one or more other streams. A respective stream of the one or more other streams includes two or more content feeds; each content feed includes a set of content items published by a respective publication source. The one or more programs also include instructions for presenting on the display to the user content items associated with the specified stream.

In another aspect, a computer readable storage medium stores one or more programs configured to be executed by a client device remotely located from a server system. The one or more programs include instructions for subscribing a user of the client device to a specified stream. The specified stream includes one or more other streams. A respective stream of the one or more other streams includes two or more content feeds; each content feed includes a set of content items published by a respective publication source. The one or more programs also include instructions for presenting to the user, on a display of the client device, content items associated with the specified stream.

In another aspect, a client device for presenting content to a user includes means for subscribing a user of the client device to a specified stream. The specified stream includes one or more other streams. A respective stream of the one or more other streams includes two or more content feeds; each content feed includes a set of content items published by a respective publication source. The client device also includes means for presenting to the user content items associated with the specified stream.

In another aspect, a method of serving content items from content feeds to a plurality of users includes storing, for each respective stream of a plurality of streams, subscription data indicating users of the plurality of users who have subscribed to the respective stream. The method also includes storing user label data indicating labels, if any, that respective users have applied to the respective stream. A first stream of the plurality of streams, subscribed to by a first user, has a label applied by the first user and includes a second stream having a second label applied by a second user and a third stream having a third label applied by a third user. The second stream and the third stream each include one or more content feeds; each content feed includes a set of content items published by a respective publication source. A list of content items of the first stream is transmitted to a client device of the first user.

In another aspect, a system for serving content, located remotely from a client device, includes memory, one or more processors, and one or more programs stored in the memory and configured for execution by the one or more processors. The one or more programs include instructions to store, for each respective stream of a plurality of streams, subscription data indicating users of the plurality of users who have subscribed to the respective stream, and to store user label data indicating labels, if any, that respective users have applied to the respective stream. A first stream of the plurality of streams, subscribed to by a first user, has a label applied by the first user and includes a second stream having a second label applied by a second user and a third stream having a third label applied by a third user. The second stream and the third stream each include one or more content feeds; each content feed includes a set of content items published by a respective publication source. The one or more programs also include instructions to transmit to a client device of the first user a list of content items of the first stream.

In another aspect, a computer readable storage medium stores one or more programs configured to be executed by a server computer system remotely located from a client device. The one or more programs include instructions to store, for each respective stream of a plurality of streams, subscription data indicating users of the plurality of users who have subscribed to the respective stream, and to store user label data indicating labels, if any, that respective users have applied to the respective stream. A first stream of the plurality of streams, subscribed to by a first user, has a label applied by the first user and includes a second stream having a second label applied by a second user and a third stream having a third label applied by a third user. The second stream and the third stream each include one or more content feeds; each content feed includes a set of content items published by a respective publication source. The one or more programs also include instructions to transmit to a client device of the first user a list of content items of the first stream.

In another aspect, a system for serving content, located remotely from a client device, includes means for storing, for each respective stream of a plurality of streams, subscription data indicating users of the plurality of users who have subscribed to the respective stream, and for storing user label data indicating labels, if any, that respective users have applied to the respective stream. A first stream of the plurality of streams, subscribed to by a first user, has a label applied by the first user and includes a second stream having a second label applied by a second user and a third stream having a third label applied by a third user. The second stream and the third stream each include one or more content feeds; each content feed includes a set of content items published by a respective publication source. The system also includes means for transmitting to a client device of the first user a list of content items of the first stream.

BRIEF DESCRIPTION OF THE DRAWINGS

FIGS. 6A, 6B, 6C and 6D are diagrams illustrating data structures for feed content items and user subscriptions, in accordance with some embodiments.

FIG. 11 is a flow diagram illustrating a process for recursively defining streams of content items, in accordance with some embodiments.

Like reference numerals refer to corresponding parts throughout the drawings.

DESCRIPTION OF EMBODIMENTS

In a content feed aggregation system, a user may subscribe to one or more content feeds and be presented with the content items included in those content feeds. The content items may be presented to the user in an ordered list, such that the format of each item in the list is uniform. However, the user may desire to view additional information about selected content items beyond that provided by a uniform list. The disclosed embodiments provide the user a way to view additional information about selected items. For example, in one mode of operation, when a user selects a first content item, the selected item is displayed in an expanded format, and other items are displayed in a compact format. When the user subsequently selects a second content item, the second item is displayed in the expanded format and the first item is displayed in the compact format.

Content feeds are also herein called feed streams. The feed items from a content feed source can be considered to be a stream of items. Furthermore, some embodiments of the content feed aggregation and distribution system described herein allow users to define virtual streams that incorporate content items from content feeds and/or other virtual streams. Thus, in these embodiments, the term "feed streams" also encompasses virtual streams defined by the users of the content feed aggregation and distribution system.

Figure 1:
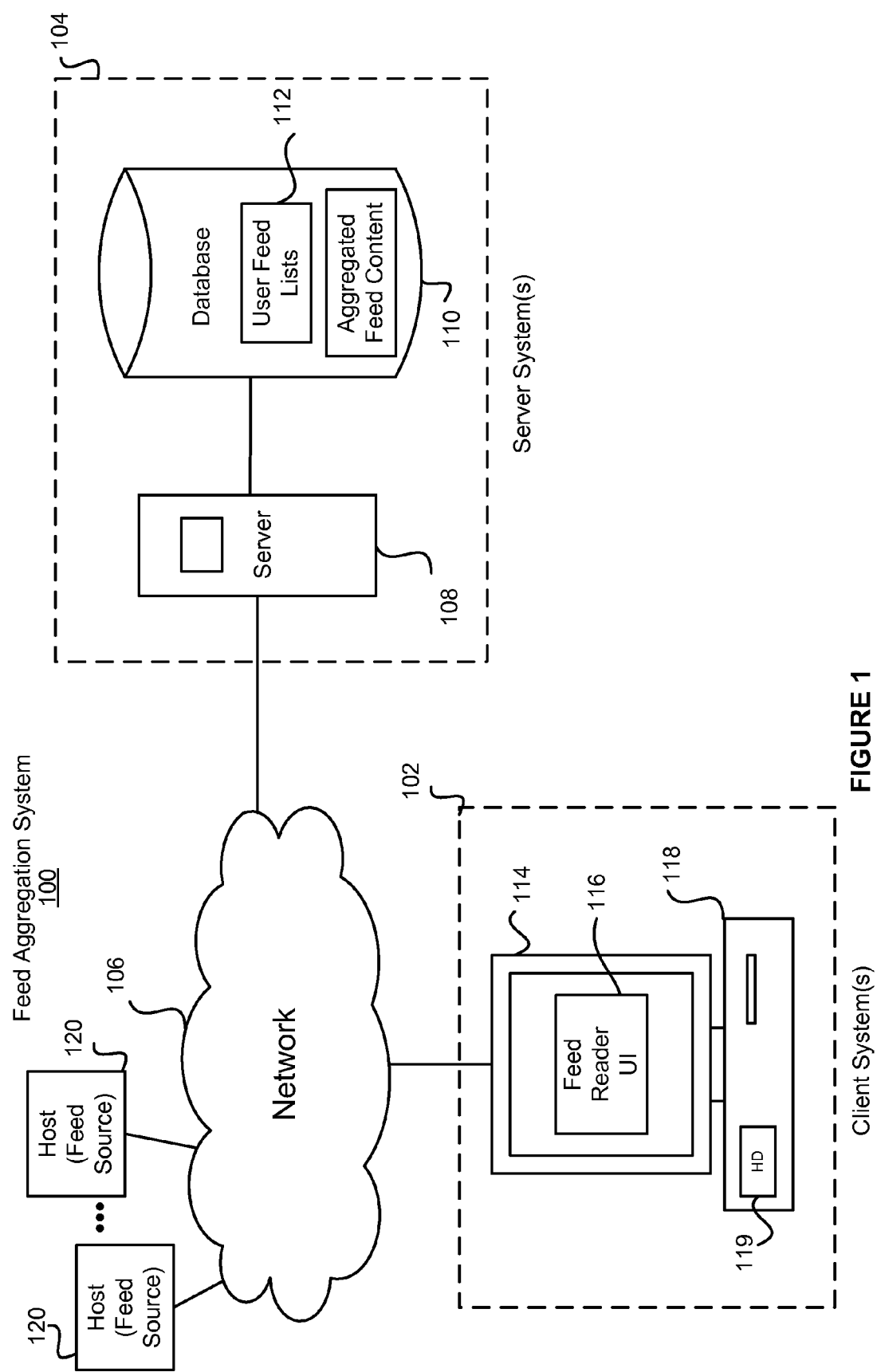
FIG. 1 is a block diagram illustrating a content feed aggregation system in accordance with some embodiments.

FIG. 1 is a block diagram illustrating a content feed aggregation system in accordance with some embodiments. The content feed aggregation system 100 includes a server system 104. The server system 104 is coupled to one or more client systems 102 and to one or more hosts 120 (or "feed sources") by a network 106. The network 106 may be any suitable wired and/or wireless network and may include a local area network (LAN), wide area network (WAN), the Internet, metropolitan area network (MAN), or any combination of such networks.

The server system 104 accesses content feeds from the feed sources 120. The server system 104 includes a server 108 and a database 110. Server 108 serves as a front-end for the server system 104. Server 108, sometimes called a front end server, retrieves the content feeds from the feed sources 120, and also provides an interface between the server system 104 and the client systems 102. In some embodiments, the functions of server 108 may be divided or allocated among two or more servers.

The server system 104 stores content items in the content feeds in the database 110. In some embodiments, the database 110 stores both metadata (e.g., title, description, URL, date/time, and possibly other metadata) and the content of each content item. However, in some other embodiments, the database 110 stores the metadata but not the content for each content item. The database 110 also stores user feed information 112 for a plurality of users. The user feed information for a particular user identifies content feed subscriptions, as well as sources, filters, and read states for that particular user. That is, user feed information associated with a user identifies the content feeds to which the user has subscribed, any filters the user has defined for the feeds, any labels the user has associated with individual feed items, and an indication of whether each feed item has been marked as "read" by the user.

It should be appreciated that the server system 104, including the server 108 and the database 110, may be implemented as a distributed system of multiple computers. However, for convenience of explanation, the server system 104 is described below as being implemented on a single computer, which can be considered a single logical system.

A content feed (or channel) is a resource or service that provides a list of content items that are present, recently added, or recently updated at a feed source 120. A content item in a content feed may include the content associated with the item itself (the actual content that the content item specifies), a title (sometimes called a headline), and/or a description of the content, a network location or locator (e.g., URL) of the content, or any combination thereof. For example, if the content item identifies a text article, the content item may include the article itself inline, along with the title (or headline), and locator. Alternatively, a content item may include the title, description and locator, but not the article content. Thus, some content items may include the content associated with those items, while others contain links to the associated content but not the full content of the items. A content item may also include additional metadata that provides additional information about the content. The full version of the content may be any machine-readable data, including but not limited to web pages, images, digital audio, digital video, Portable Document Format (PDF) documents, and so forth.

In some embodiments, a content feed is specified using a content syndication format, such as RSS. RSS is an acronym that stands for "rich site summary," "RDF site summary," or "Really Simple Syndication." "RSS" may refer to any of a family of formats based on the Extensible Markup Language (XML) for specifying a content feed and content items included in the feed. In some other embodiments, other content syndication formats, such as the Atom syndication format or the VCALENDAR calendar format, may be used to specify content feeds.

Further information regarding the RSS syndication format known as "Really Simple Syndication" is disclosed in the *RSS 2.0 Specification* by D. Winer, which is hereby incorporated by reference herein in its entirety. M. Nottingham et al. disclose further information regarding the Atom syndication format in *The Atom Syndication Format*, which is hereby incorporated by reference herein in its entirety.

A user interfaces with the server system 104 and views content items at a client system or device 102 (hereinafter called the client system for ease of reference). The client system 102 includes a computer 118 or computer controlled device, such as a personal digital assistant (PDA), cellular telephone or the like. The computer 118 typically includes one or more processors (not shown); memory, which may include volatile memory (not shown) and non-volatile memory such as a hard disk drive 119; and a display 114. The computer 118 may also have input devices such as a keyboard and a mouse (not shown).

In some embodiments, a user may interact with the server system 104 via a feed reader user interface 116 that may be presented on the display 114. The user may create a list of feed subscriptions via the feed reader user interface 116. In some embodiments, using the feed reader user interface 116, the user may also create filters or labels to be applied to content feeds and/or content items, and modify the read states of content feeds and/or content items. The feed reader user interface transmits a list of content feed subscriptions, or modifications to a list of content feed subscriptions, to the server system 104 for storage at the database 110. The feed reader user interface 116 presents content items stored at the database 110 to the user based on the user's list of content feed subscriptions. That is, feed reader user interface 116 presents to the user content items specified in the content feeds to which the user has subscribed. A user may view the full version of the content of a content item in the feed reader user interface 116 by selecting it (e.g., by clicking on it with a mouse pointer). In some embodiments, a copy of the user's list of content feed subscriptions and copies of the presented content items may be cached locally at the client system 102.

In some embodiments, the feed reader user interface 116 may be a web-based user interface. That is, the feed reader user interface 116 includes one or more web pages. It is noted that a single web page can contain multiple frames, each of which may appear (when displayed by a browser application) to be a distinct web page. The web page(s) may be written in the Hypertext Markup Language (HTML), Extensible Markup Language (XML), or any other suitable language for preparing web pages, and may include one or more scripts for interfacing with the server system 104. For example, the web page(s) may include a Javascript application that interfaces with the server system 104 via an application programming interface (API). The Javascript application receives content items from the server system 104, manages the rendering of those content items at the client, and also performs the client-side aspects of other tasks, such as marking items as read, adding and removing content feed subscriptions, labeling content feed subscriptions and/or individually selected content items, selecting or revising user preferences, and the like. The user may subscribe to content feeds, view content items, and otherwise interact with the server system 104 by interacting with the web page(s) of the feed reader user interface 116. In other words, the server system 104, including the feed reader user interface 116, provides a web-based content aggregation service. The server system 104 aggregates and stores content items in accordance with the user's content feed subscriptions. In some embodiments, the server system 104 can also apply filters or labels, or change the read states of content items in accordance with user actions or instructions. When the user accesses the feed reader user interface 116, the content items are presented to the user via the feed reader user interface 116.

In some other embodiments, the feed reader user interface 116 may be a part of a standalone application that is run on the client system 102. The standalone application may interface with the server system 104 via an application programming interface (API).

Figure 2A:
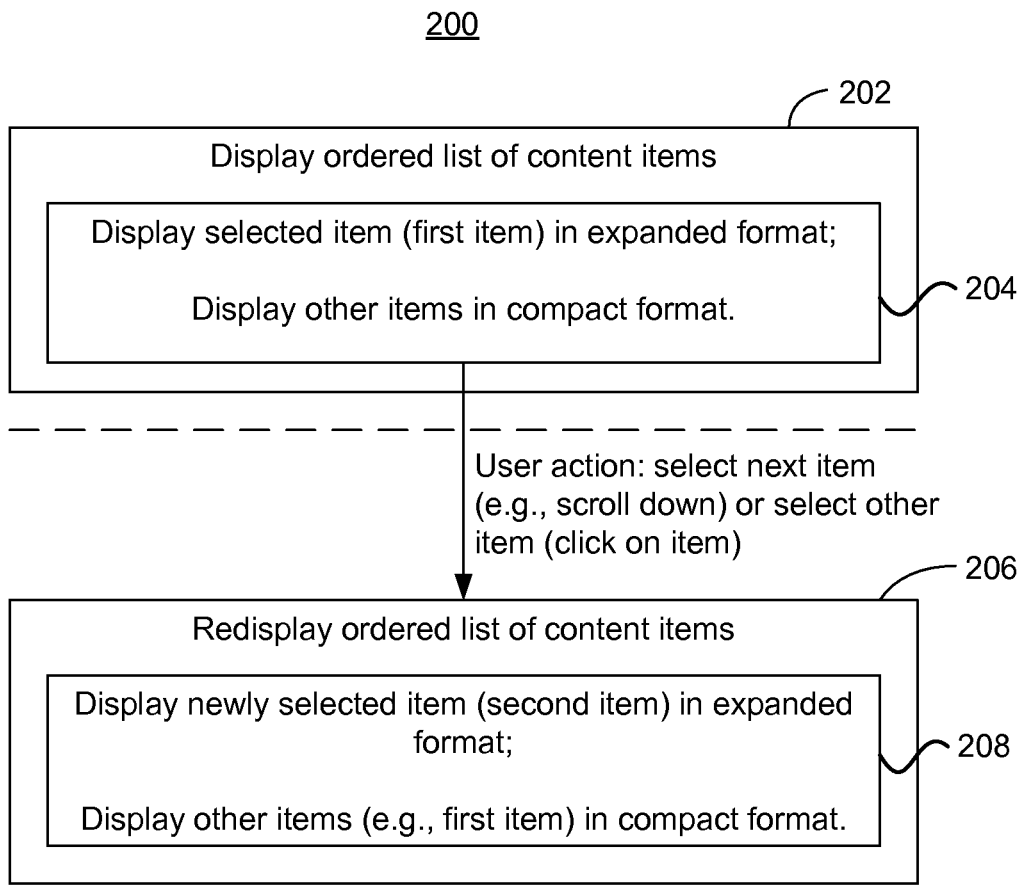
FIGS. 2A-2D are flow diagrams illustrating processes for presenting content items to a user, in accordance with some embodiments.

FIG. 2A is a flow diagram illustrating a process 200 for presenting content items to a user, in accordance with some embodiments. Process 200 occurs at a client device, on a client application that permits the user to interact with server system 104 via feed reader user interface 116. User interface 116 displays an ordered list of content items (202). The content items are specified in content feeds to which the user has subscribed. A selected first item is displayed in expanded format, and other items are displayed in compact format (204). FIG. 3B depicts an exemplary schematic screen shot of a user interface showing a first item, in an ordered list of content items, in expanded format and the other items in a compact format. In one embodiment, the compact format includes the publication source, headline, and timestamp associated with each item, with each item presented in a single line. In another embodiment, the compact format further includes a snippet (a small portion) of the content, also displayed on the single line. In an embodiment, the expanded format displays the same information as the compact format on a first line of the expanded format. In addition, the expanded format displays the title (sometimes called the headline) and source of the content on subsequent lines, in a larger font than the font used on the first line, and displays some or all of the content below the title and source. In other embodiments, the expanded format may include additional information associated with the content item. For example, a content item displayed in the expanded format may include a link to the full content associated with the content item. The link includes the URL of a web page or other document that contains the full content of the content item.

A user may select a next item (second item), for example by scrolling down the list, or may select another item (second item), for example by clicking on it. In response, the ordered list is redisplayed (206). The newly selected second item is displayed in expanded format, while other items, such as the first item, are displayed in compact format (208). FIG. 3C depicts an exemplary schematic screen shot of a user interface showing a second item in expanded format while the first item and other items are displayed in compact format.

Figure 2B:
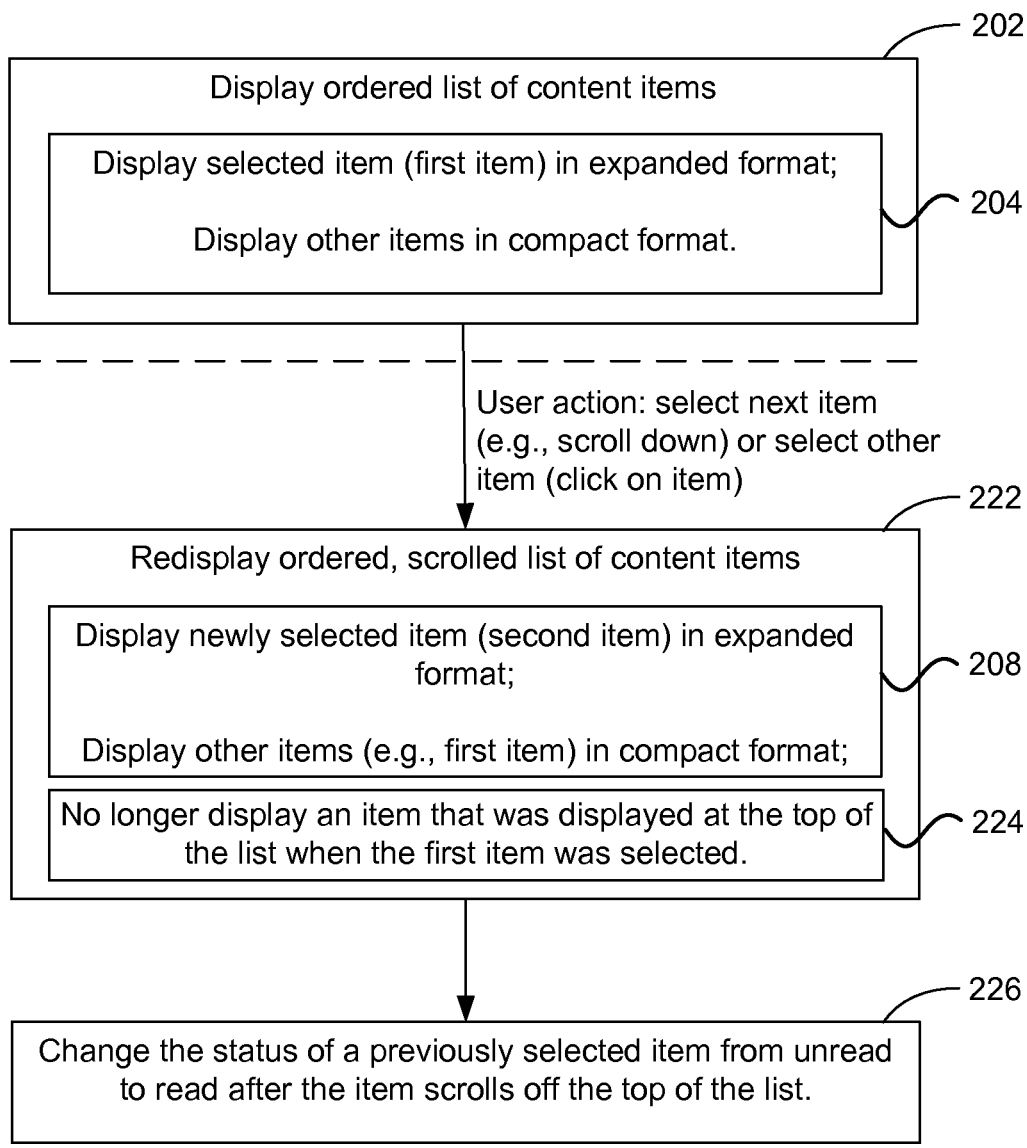

FIG. 2B is a flow diagram illustrating a process 220 for presenting content items to a user, in accordance with some embodiments. An ordered list of contents items is displayed with a selected first item in expanded format and other items in compact format, as described above (202, 204). When a user selects a second item, the ordered list is redisplayed (222). If the user has selected a second item by scrolling down the list, the redisplayed list is scrolled appropriately. The newly selected item is displayed in expanded format, while other items, such as the first item, are displayed in compact format (208). If the user has scrolled down the list, one or more items previously displayed at the top of the list when the first item was selected are no longer displayed (224). In some embodiments, the status of a previously selected item is changed from unread to read when the item scrolls off the top of the displayed list (226). More specifically, when an item that has been viewed in expanded format scrolls off the top of the display list (226), the client sends a message to the server system identifying the content item to be marked as read, and the server system then updates the status of the content item accordingly.

As discussed below with reference to FIG. 2D, in some other embodiments, content items are marked as read when they are displayed in expanded format. Alternatively, content items are marked as read when they are selected, regardless of whether they are displayed in expanded or compact format. Furthermore, in some embodiments, content items that have been marked as read, which have not yet been scrolled off the displayed list, are displayed in a manner that is distinct from the display of unread items. For example, one or more portions of the displayed text (e.g., the displayed title or headline) of items marked as read may be displayed using a light shade of gray while the corresponding text or text portions of unread items may be displayed using black text.

Figure 2C:
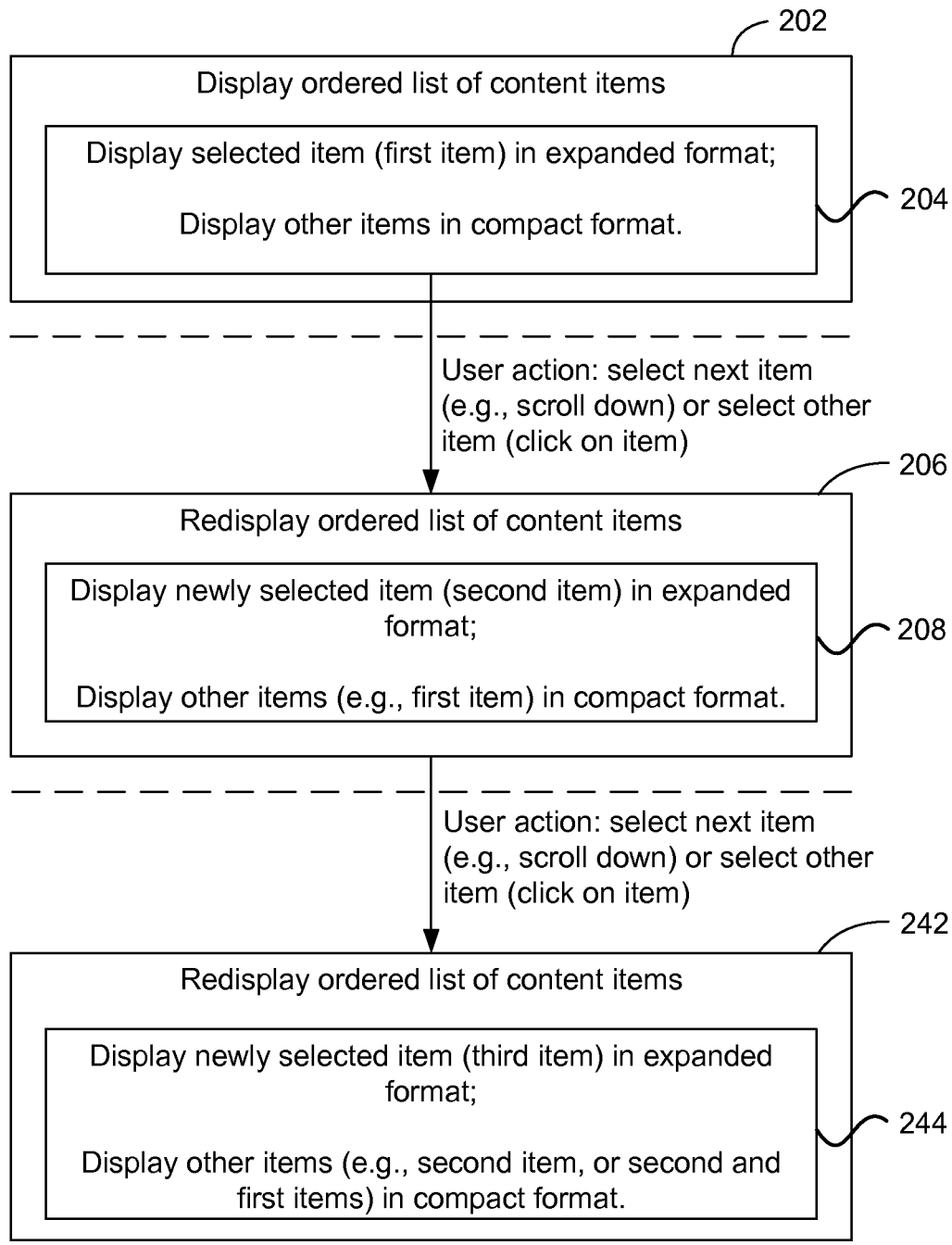

FIG. 2C is a flow diagram illustrating a process 240 for presenting content items to a user, in accordance with some embodiments. Process 240 begins with operations 202-208, described above with regards to FIG. 2A. After operation 208, the displayed ordered list includes a newly selected second item displayed in expanded format and other items, such as the previously selected first item, displayed in compact format. A user may select a next item (third item), for example by scrolling down the list, or may select another item (third item), for example by clicking on another item. In response, the ordered list is redisplayed (242). The newly selected third item is displayed in expanded format, while other items, such as the second and first items, are displayed in compact format (244). However, if the user scrolls through the list to select the third item, the first or second items may not be displayed (e.g., because they have been scrolled off the top or bottom of the displayed list of content items), depending on how far through the list the user scrolls.

Figure 2D:
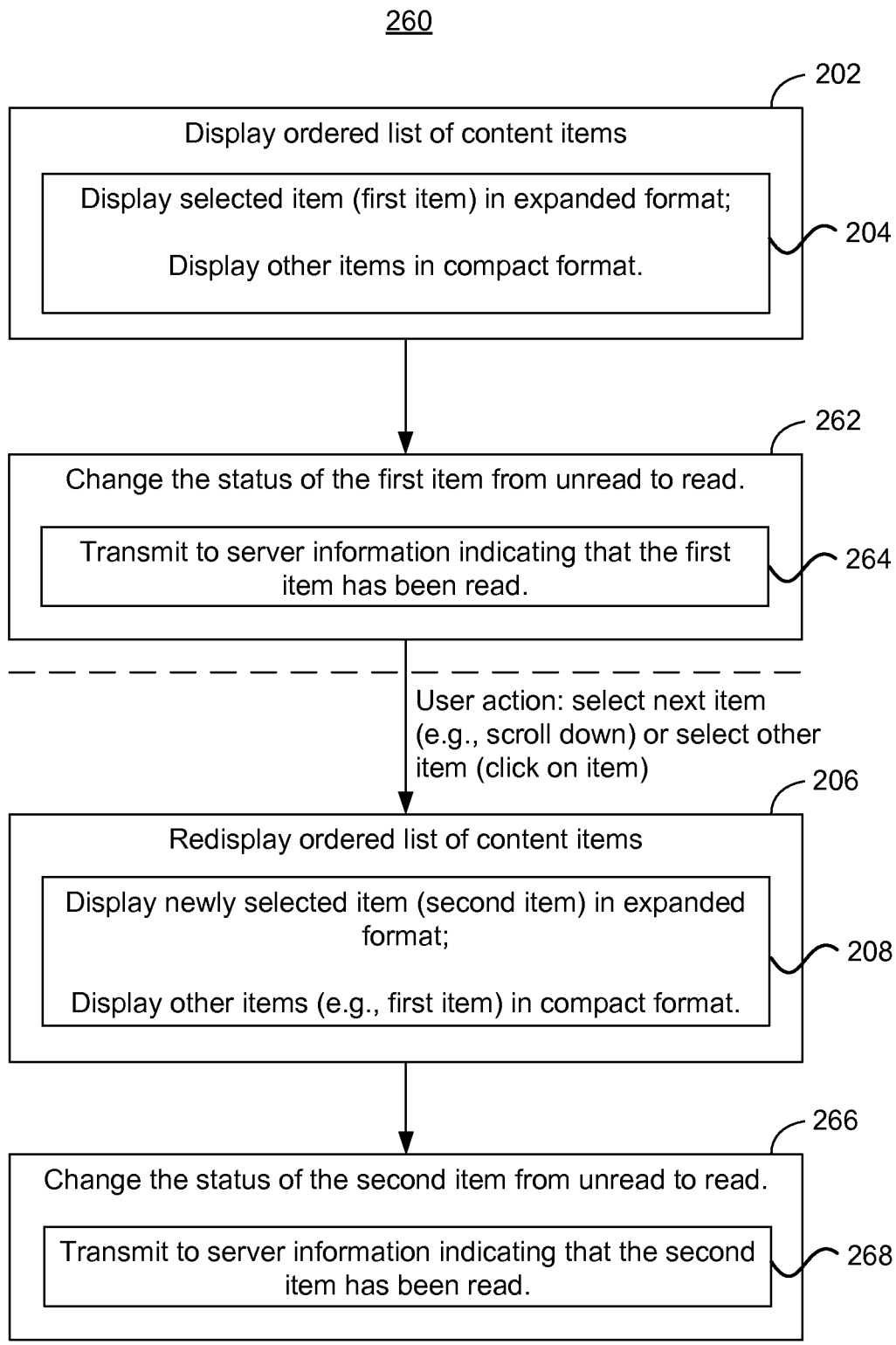

FIG. 2D is a flow diagram illustrating a process 260 for presenting content items to a user, in accordance with some embodiments. Operations 202 and 204 are performed as described above with regards to FIG. 2A. Selection of the first item results in the status of the first item being changed from unread to read (262). In one embodiment, the status is changed by transmitting information to server 108 indicating that the first item has been read (264). Server 108 then updates database 110 to reflect that the first item has been read by the user.

A user may select a next item (second item), for example by scrolling down the list, or may select another item (second item), for example by clicking on another item. In response, the ordered list is redisplayed (206). The newly selected second item is displayed in expanded format, while other items, such as the first item, are displayed in compact format (208). Selection of the second item results in the status of the second item being changed from unread to read (266). In one embodiment, the status is changed by transmitting information to server 108 indicating that the second item has been read (268). Server 108 then updates database 110 to reflect that the second item has been read by the user.

Figure 3A:
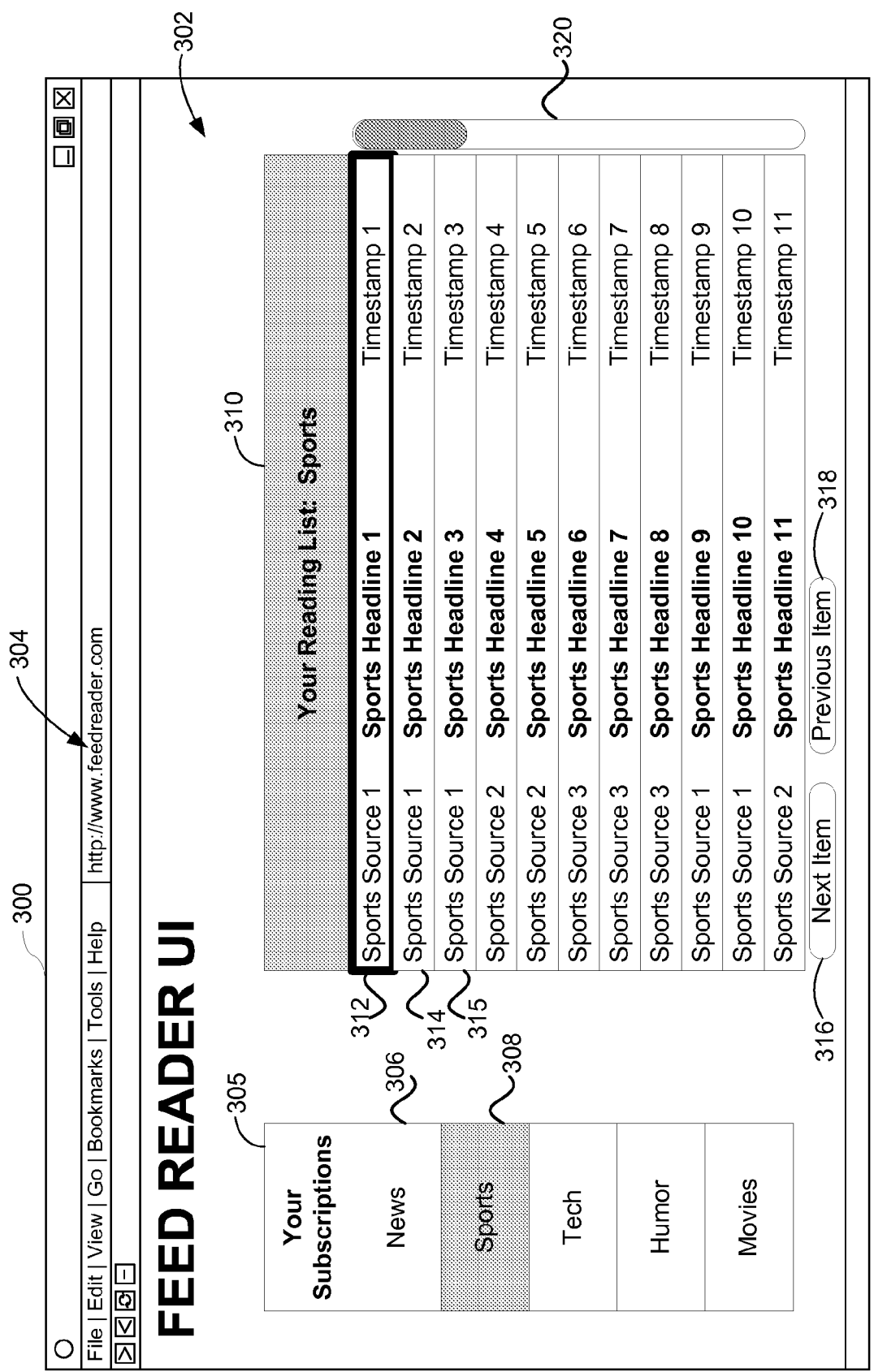
FIGS. 3A-3D are schematic screenshots of the user interface of a content feed reader in accordance with some embodiments.
Figure 3B:
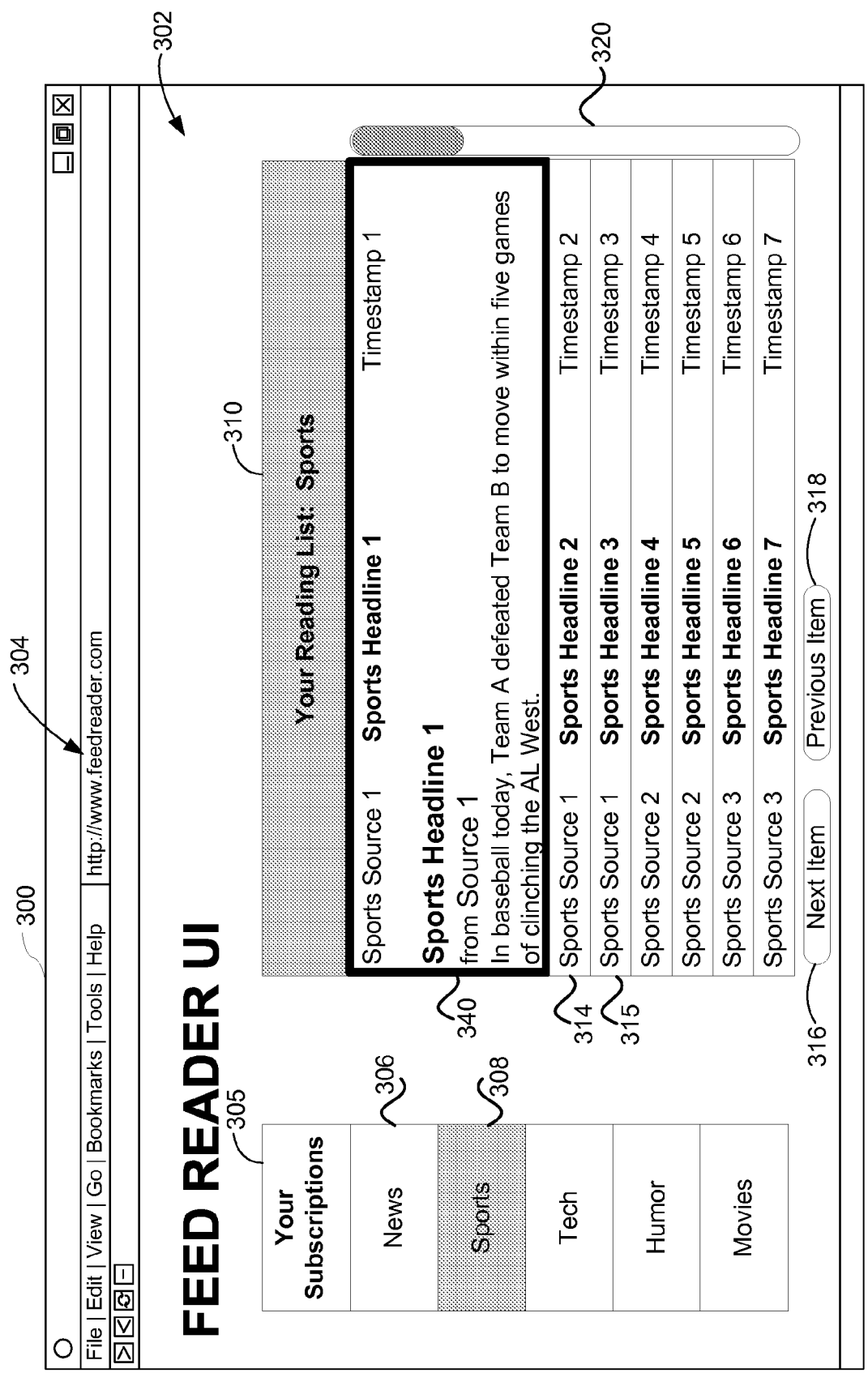
Figure 3C:
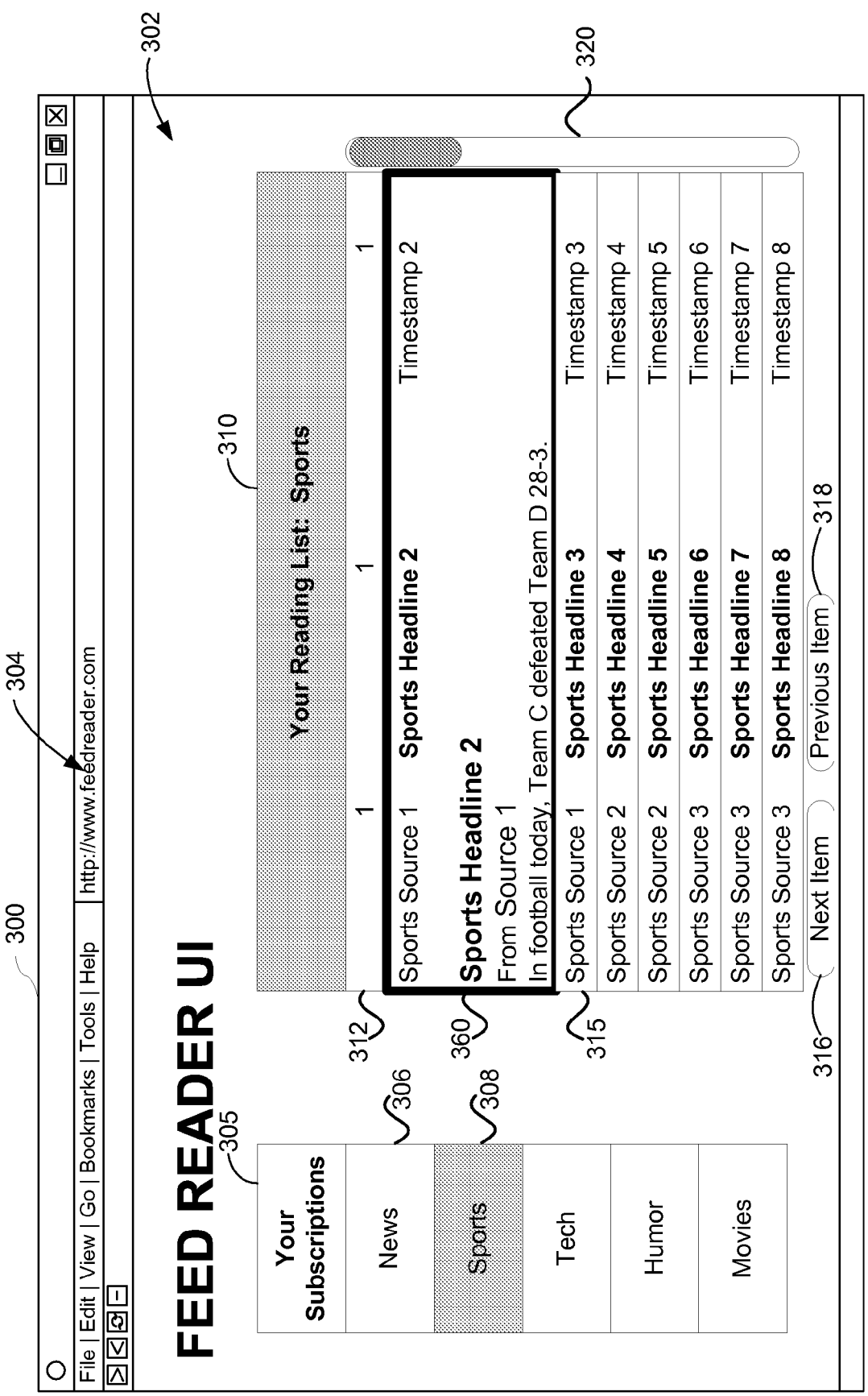

FIG. 3A is a schematic screenshot of a web browser's user interface 300 (sometimes hereinafter called the web browser for convenience), presenting a web page that displays a feed reader user interface 302, in accordance with some embodiments. The web browser 300 can be any type of browser application that permits a user to display and interact with web pages or other documents or information. The web browser's user interface includes a URL field 304 for entering the URL of any web page that a user wants to display, as well as for displaying the URL of the web page currently being displayed. The user may access a web page displaying a feed reader's user interface 302 by entering in the URL field 304 the URL associated with feed reader user interface 302.

Feed reader user interface 302 includes a list 305 of labels, also referred to as folders, associated with content feeds to which a user has subscribed. Exemplary labels shown in FIG. 3A include "News" 306 and "Sports" 308. The labels or folder names may be user defined names. User interface 302 also includes an ordered list 310 of content items associated with a selected label. For example, in FIG. 3A, the "Sports" label 308 has been selected by the user, as indicated by a shaded background. In this example, ordered list 310 includes items 312, 314, and 315. In some embodiments, items in ordered list 310 are ordered according to timestamps associated with the items. In some other embodiments, items in ordered list 310 are ordered in accordance with a score that takes into account both the content of the items and the timestamps of the items.

A user may select a different label, for example by clicking on a different label. If a user selected the "News" label 306, ordered list 310 would display content items associated with "News" label 306. Also, user interface 302 would indicate that the "News" label 306 was selected by displaying it with a shaded background. In this example, the background for "Sports" label 308 would no longer be shaded after the user selected "News" label 306.

In FIG. 3A, all items in ordered list 310, including items 312, 314, and 315, are displayed in compact format. In this embodiment, compact format includes the source, headline, and timestamp for each item, displayed in a single line. For example, the compact format display for item 312 includes "Sports Source 1," "Sports Headline 1," and "Timestamp 1," all displayed on the same line of ordered list 310. In other embodiments, compact format might include additional information. For example, a brief portion of the content could be displayed next to the headline.

User interface 302 shows that an item in ordered list 310 is selected by displaying that item with a bold border. In FIG. 3A, item 312 is selected, as indicated by its bold border. Items 314 and 315 are not selected, as indicated by their narrow borders. In other embodiments, a selected item may have a border with a different color from that of other items (e.g., a thick blue border for the selected item and a gray or thin black border for the unselected items). A user may select another item (second item) by clicking on "Next Item" button 316 or "Previous Item" button 318, by clicking directly on another item, or by scrolling through ordered list 310 using scrollbar 320 and then clicking on another item. For example, in FIG. 3A, a user could select item 314 by clicking "Next Item" button 316 or by clicking directly on item 314. Item 314 then would be displayed with a bold border, and other items, such as item 312, would appear with narrow borders.

FIG. 3B is a schematic screenshot of a web browser 300 presenting a web page that displays a feed reader user interface 302, in accordance with some embodiments. As in FIG. 3A, user interface 302 includes a list 305 of labels associated with content feeds to which a user has subscribed and an ordered list 310 of content items associated with a selected label. However, a selected content item 340 is displayed in expanded format, while other content items, such as a second item 314, are displayed in compact format. Item 340 corresponds to item 312 displayed in compact format in FIG. 3A. In an embodiment, the expanded format displays the same information as the compact format on a first line, such as the source, headline, and timestamp for each item. The headline then is displayed again in larger type on a second line, the source is displayed again on a third line, and the content is displayed on a fourth and subsequent lines as necessary. This embodiment of expanded format is illustrated by content item 340. In a different embodiment, the expanded format does not display the same information as the compact format on a first line; instead, it displays the headline and source in larger type than in the compact format, followed by the content on subsequent lines.

As discussed above in regards to FIG. 3A, a user may select another item (second item). For example, in FIG. 3B, the user might select item 314, by clicking on item 314 or by clicking "Next Item" button 316. FIG. 3C, a schematic screenshot of a web browser 300 presenting a web page that displays a feed reader user interface 302, shows the result of this user action according to an embodiment. The selected item 360 (corresponding to item 314 in compact format) appears in expanded format. Other items, including first item 312 (corresponding to item 340 in expanded format) are displayed in compact format.

In the example of FIGS. 3B and 3C, item 360 is not as large as item 340: it has only one line of content as opposed to two. Therefore, the ordered list 310 in FIG. 3B displays fewer items than the ordered list 310 in FIG. 3C: ordered list 310 in FIG. 3B displays seven items, while ordered list 310 in FIG. 3C displays eight items. In general, the number of items displayed in ordered list 310 will vary depending on the size in expanded format of the selected item.

Figure 3D:
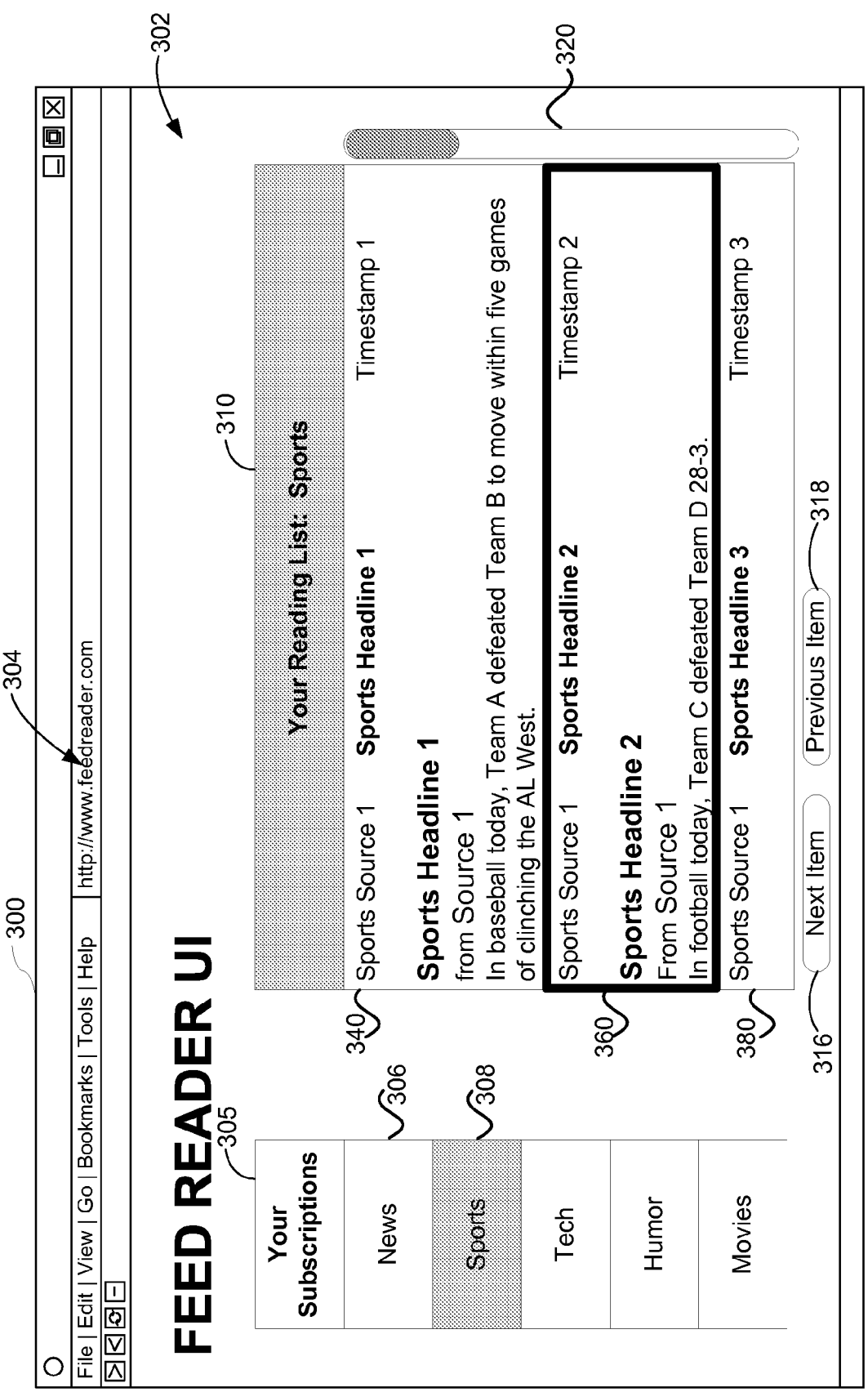

FIG. 3D is a schematic screenshot of a web browser 300 presenting a web page that displays a feed reader user interface 302, in accordance with some embodiments. As in FIGS. 3A-3C, user interface 302 includes a list 305 of labels associated with content feeds to which a user has subscribed and an ordered list 310 of content items associated with a selected label. However, all items in ordered list 310 are displayed in expanded format. Items 340 and 360 (corresponding respectively to items 312 and 314 in compact format) are displayed in their entirety. Only the top portion of item 380 (corresponding to item 315 in compact format) is displayed, because there is not enough space to display the entire item in expanded format. Because the size of each item in expanded format varies, depending for example on the amount of content, the number of displayed items will vary in general.

Some, but not necessarily all, content items displayed in expanded format include a link to the full content associated with those content items. The link may be activated by a user clicking on the headline in the content item, or by clicking on a link icon (not shown in FIGS. 3A-3D) displayed in the expanded format of a respective content item. Activation of the link typically causes the browser to open a new browser window or tab and to download and display the document (if any) located at the location (e.g., URL) specified by the link.

Although not shown in FIGS. 3A-3D, the feed reader user interface will typically include icons, menu items or the like for reviewing and managing the user's content feed subscriptions, including removing and adding content feed subscriptions, and optionally labeling a respective content feed subscription with one or more user defined labels (or, alternately, assigning the respective content feed subscription to one or more user defined folders).

Figure 4:
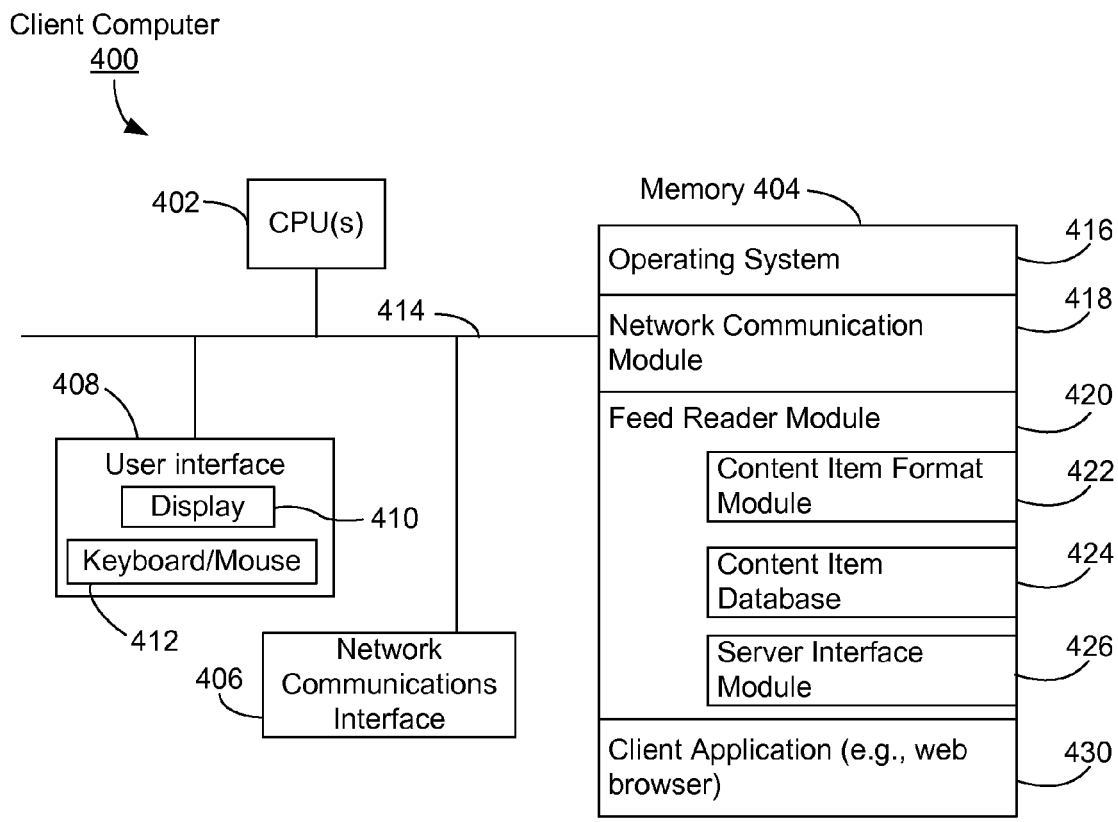
FIG. 4 is a block diagram illustrating a client computer in accordance with some embodiments.

FIG. 4 is a block diagram illustrating a client computer in accordance with some embodiments. The client computer 400 typically includes one or more processing units (CPU's) 402, one or more network or other communications interfaces 406, memory 404, and one or more communication buses 414 for interconnecting these components. The communication buses 414 may include circuitry (sometimes called a chipset) that interconnects and controls communications between system components. The client computer 400 may also include a user interface 408 comprising a display device 410 and a keyboard and/or mouse (or other pointing device) 412. Memory 404 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 404 may optionally include one or more storage devices remotely located from the CPU(s) 402. In some embodiments, memory 404 stores the following programs, modules and data structures, or a subset thereof:

- an operating system 416 that includes procedures for handling various basic system services and for performing hardware dependent tasks;
- a network communication module 418 that is used for connecting the client system 400 to other computers via the one or more communication network interfaces 406 and one or more communication networks, such as the Internet, other wide area networks, local area networks, metropolitan area networks, and so on;
- a feed reader module 420 for handling content items from content feeds; and a client application 430, such as a web browser.

The feed reader module 420 includes a content item format module 422 for determining the format in which to display content items, a local database 424 for storing content items sent by the server, and a server interface module 426 for interfacing with server computer 500.

In some embodiments, the feed reader module 420 may be a script-based module, embedded in a web page served from the server system 104 (FIG. 1). The web page may be rendered by a client application 430, such as a web browser, at the client computer 400. When the web page is rendered, the feed reader module 420 is executed, thereby providing a web-based interface to the server system 104. The script-based feed reader module may be written in JavaScript, ECMAScript or any other suitable scripting language.

In some other embodiments, the feed reader module 420 may be a standalone application stored in memory 404 of the client computer 400. The standalone application may include, but is not limited to a feed aggregator application. In further other embodiments, the feed reader module 420 may be an add-on or a plug-in to another application. For, example, the feed reader module 420 may be a plug-in or extension to a web browser application or an email application.

In some embodiments, received content items may be cached locally in memory 404. Similarly, a user's list of content feed subscriptions may also be cached locally in memory 404.

Each of the above identified elements in FIG. 4 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 404 may store a subset of the modules and data structures identified above. Furthermore, memory 404 may store additional modules and data structures not described above.

Figure 5:
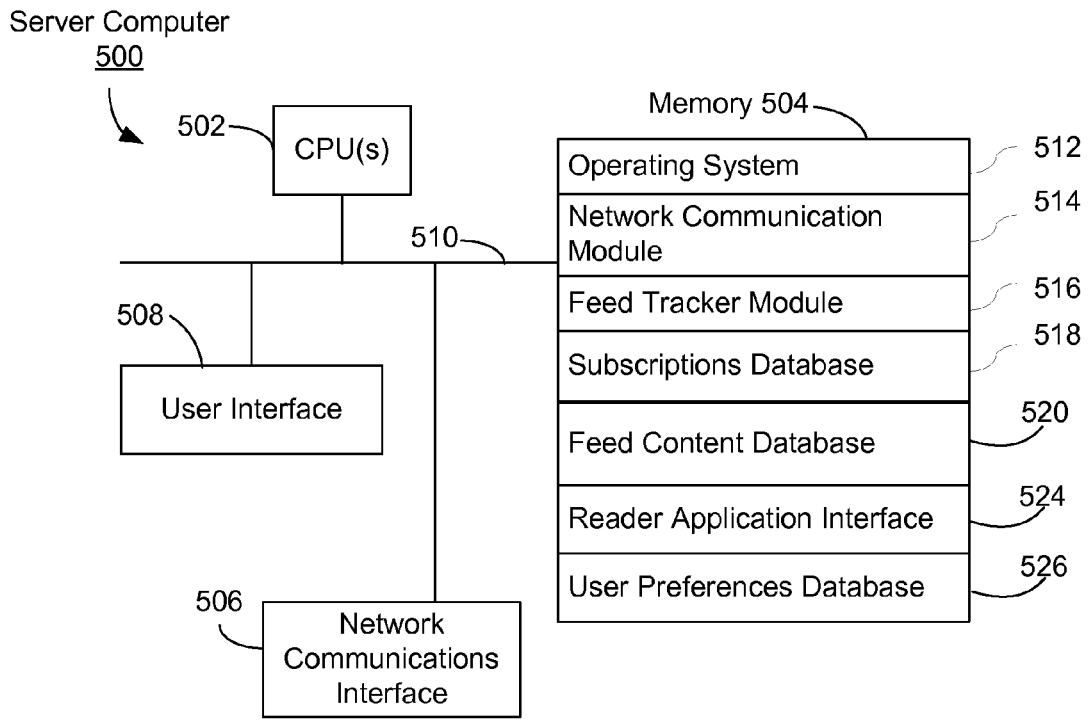
FIG. 5 is a block diagram illustrating a server computer in accordance with some embodiments.

FIG. 5 is a block diagram illustrating a server computer 500 in accordance with some embodiments. The server computer 500 typically includes one or more processing units (CPU's) 502, one or more network or other communications interfaces 506, memory 504, and one or more communication buses 510 for interconnecting these components. The communication buses 510 may include circuitry (sometimes called a chipset) that interconnects and controls communications between system components. The server system 500 optionally may include a user interface 508, which may include a display device (not shown), and a keyboard and/or a mouse (not shown). Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the CPU(s) 502. In some embodiments, memory 504 stores the following programs, modules and data structures, or a subset thereof:

- an operating system 512 that includes procedures for handling various basic system services and for performing hardware dependent tasks;
- a network communication module 514 that is used for connecting the server system 500 to other computers via the one or more communication network interfaces 506 and one or more communication networks, such as the Internet, other wide area networks, local area networks, metropolitan area networks, and so on;
- a feed tracker module 516 for retrieving content items for storage periodically and/or as content feeds are updated;
- a subscriptions database 518 for storing information about the content feed subscriptions of users of the system;
- a feed content database 520, for storing content items from content feeds and user information about content items that respective users have read, labeled, and so on;
- a reader application interface 524 for exchanging information with the feed reader modules in one or more client computers; and
- a user preferences database 526 for storing user-specific information, including user preferences with regard to the user interface.

Each of the above identified elements in FIG. 5 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 504 may store a subset of the modules and data structures identified above. Furthermore, memory 504 may store additional modules and data structures not described above.

Although FIG. 5 shows a "server computer," FIG. 5 is intended more as a functional description of the various features which may be present in a set of servers than as a structural schematic of the embodiments described herein. In practice, and as recognized by those of ordinary skill in the art, items shown separately could be combined and some items could be separated. For example, some items shown separately in FIG. 5 could be implemented on single servers and single items could be implemented by one or more servers.

Figure 6A:
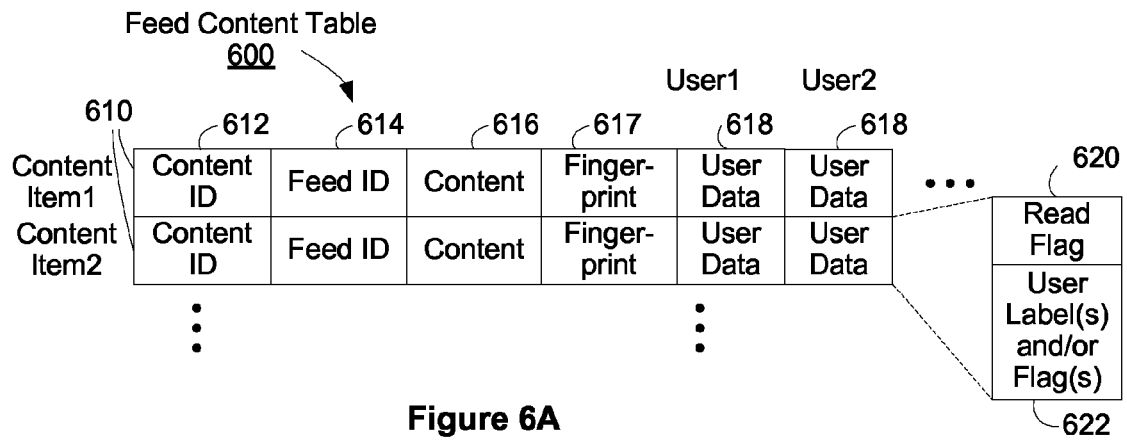

FIG. 6A is a diagram illustrating a data structure for feed content items, in accordance with some embodiments. As described above, a server computer 500 (FIG. 5) may store a plurality of feed content items in feed content database 520. The feed content items may be stored in a data structure, such as a table data structure 600. The feed content table 600 includes a row 610 for each content item from each feed source. Each row includes one or more fields (612, 614) that identify the content item, such as a content ID 612 and a feed ID 614 (which identifies the feed source of the content item). In some embodiments, the content ID may include information that uniquely identifies the feed source, in which case the feed ID 614 may be omitted. Each row 610 may further include content 616 and a content fingerprint 617 of the content item. The content 616 may include the metadata of the content item (e.g., title, description, URL, date/time, and possibly other metadata), and may further include the actual content of the content item. In some embodiments, the content fingerprint 617 of a content item may be generated by applying a hash function to the content 616 of the item, and the web page or document, if any, referenced by the content item (e.g., referenced by a URL or publisher-assigned ID in the content item). In addition, each row 610 includes a column 618 or field for each registered user of the system. The user data in this column may include a read flag 620, which indicates whether the user corresponding to this column has read the content item associated with the row 610 containing the user data. The user data in column 618 also may optionally include additional user information, such as one or more user specified labels or flags 622. A user may tag or label content items, as well as content feeds, and a record of the tag or label that the user associated with each labeled content item is stored in the user data 618. In some embodiments, the system may allow users to tag or label individual content items with predefined tags or labels (e.g., star, red, blue, etc.), and some embodiments further allow users to tag or label individual content items with user-defined labels (e.g., "news," "music," etc.). Furthermore, a content item, represented by a row 610, may by tagged by any number of users.

Figure 6B:
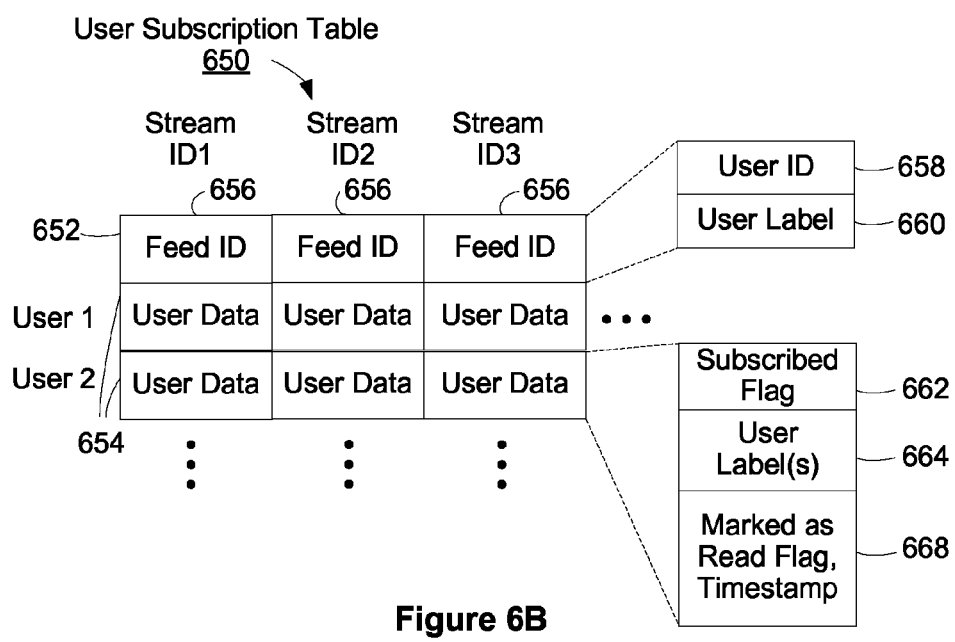

FIG. 6B is a diagram illustrating a data structure for user subscriptions, in accordance with some embodiments. As described above, a server computer 500 (FIG. 5) may store user subscription information in subscriptions database 518. The user subscription information may be stored in a data structure, such as a table data structure 650. A user subscription information table 650 stores feed identifications for feed streams known to the system and user data for those feed streams. The user subscription table 650 includes fields or columns 656 corresponding to the stream ID's for each content stream known to the system, including both real content streams (typically corresponding to content streams from publication sources at well defined network locations) and virtual content streams. A virtual content stream is a content stream derived from one or more other content streams within the context of the server system 104. For example, a virtual content stream may include a set of real content streams assigned a label by a user. In another example, a virtual stream may include individual content items assigned a particular label by a user; the labeled content items may be from one or more real content streams. In one embodiment, a virtual stream can be identified by the user who created the stream and the user label assigned to the virtual stream by the user. Thus, the stream ID of a virtual stream may include the user ID 658 of the user who created the virtual stream and the user label 660 assigned to the virtual stream by that user. Alternately, the stream ID of a virtual stream may be generated or assigned by a mapping function that maps virtual streams to virtual stream ID's.

Table 650 further includes a row 654 for each user, with fields or columns 656 containing user data for each content stream. In some embodiments, the user data for a respective content stream includes a subscribed flag 662 indicating whether the user has subscribed to the content stream associated with the column 656 containing the user data. The user data may also include a marked-as-read flag and timestamp 668, which indicates whether and when the user corresponding to the row has viewed the items in the content stream associated with the column 656. The user data may further include additional user information, such as one or more user specified labels 664. A user may label content streams that the user may want to view again in the future, and a record of the label that the user associated with a content stream may be stored in the user data 656.

Figure 6C:
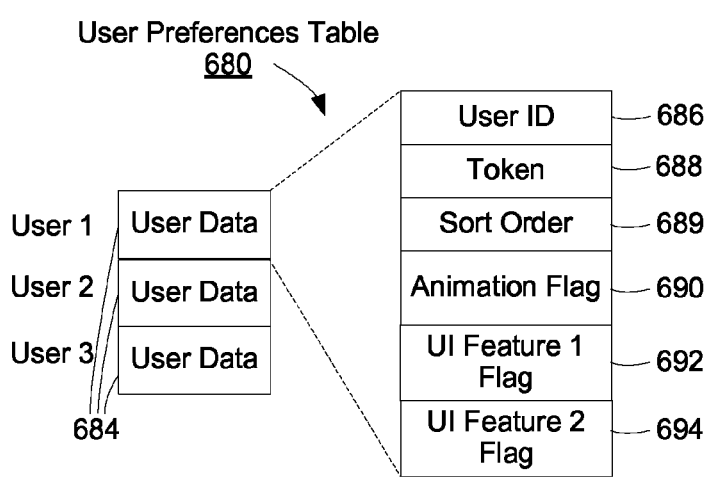

FIG. 6C is a diagram illustrating a data structure for user preferences, in accordance with some embodiments. As described above, a server computer 500 (FIG. 5) may store user preference information in user preferences database 526. The user preference information may be stored in a data structure, such as a table data structure 680. User preferences table 680 contains user data 684 (e.g., in a row or record of the table 680) for each user. The user data 684 optionally includes a user ID 686 (which may be implied by the location of the user data 684 in the user preferences table 680), and a token 688 used by server 500 to authenticate requests from the user. In some embodiments, the token 688 is generated using a random or pseudo-random number generator or function, and is of sufficient length that it would be impractical to guess or independently replicate the token. In some embodiments, users who have not implemented the bookmark feature discussed below are not assigned a token 688. Instead, a respective token 688 is generated and stored in the user data 684 of a user when the user first implements the bookmark feature. As described in more detail below, the token is used in the bookmark feature to prevent interlopers from forging a user's feed reader bookmark(s) (sometimes herein called a content feed bookmark), which would enable unauthorized access to a user's feed reader account, and which in turn would result in content items being marked as read even though they had never been seen by the user.

The user data optionally may include one or more additional fields 689, 690, 692, 694. For example, the user data optionally may include a sort order flag 689, for specifying the order in which to display content items on a user interface, such as user interface 302 (FIG. 3A). For example, content items may be displayed in chronological order or according to a ranking based on predefined criteria (e.g., the quantity and/or quality of the content in the content items, as well as the recency of the content items). The user data may further include an animation flag 690 to indicate whether or not to display animations on the user interface. The user data may include user interface feature flags or parameter values (692, 694) to specify other user interface characteristics associated with the user. For example, user interface feature flags may be used to specify the formatting and color of a user interface. In an embodiment, users may set the sort order flag, the animation flag and user interface feature flags via menus accessible from the user interface (not shown).

Feed content table 600, user subscription table 650, and user preferences table 680, or portions of these tables, may be stored using sparse table storage mechanisms, since large portions of the user data in these tables may be empty or set to default values.

FIG. 6D is a diagram illustrating an example of a user subscription table, such as user subscription table 650 (FIG. 6B), in accordance with some embodiments. As explained above, user subscription table 650 includes rows for each user known to the system and columns for each content stream known to the system, including both real and virtual content streams. In the example of user subscription table 625, columns 630 and 632 are associated with real content streams, corresponding to streams from publication sources at well-defined network locations. Specifically, stream 1 (630) is available at a network location indicated by URL1 and stream 2 (632) is available at a network location indicated by URL2. In an embodiment, the URL's associated with real streams are used as feed ID's and are listed in row 640 of user subscription table 625. The check mark under stream 1 (630) for user 3 (646) indicates that user 3 has subscribed to stream 1.

Columns 634, 636 and 638 are associated with virtual content streams, defined as streams derived from one or more other content streams. For example, user 1 (642) has subscribed to streams 1 (630) and 2 (632) and assigned the label "tech" to both streams, as indicated by the check mark and text "label:tech" at the intersection of row 642 with columns 630 and 632. User 1 thereby created stream 3 (634), a virtual stream. In some embodiments, a respective virtual stream is given a feed ID that includes a user name or identifier and a label assigned by a respective user (e.g., the feed ID may have the form "user#:label"). Examples of such feed ID's are listed in row 640 of FIG. 6D. In this example, stream 3 has the feed ID "User1:tech." Because the feed ID of a respective virtual stream includes the user name or identifier of the user who defined the virtual stream, multiple users may use the same label without conflict. For example, user 25 (row not shown)

has assigned the label "tech" to one or more streams, resulting in stream 5 (638) with feed ID "User25:tech".

Some virtual streams may correspond to (or may include) individual content items on one or more content feeds that have been labeled by a respective user. For example, a user (e.g., "user99") may mark or label specific content feed items as "favorite" items, or the user may assign a user-specified label (e.g., "best" or "reviews") to specific feed items. If the set of user labeled items is made available for subscription by others, the user-labeled items become a virtual stream that is assigned a stream identifier, such as "user99:best". This virtual stream is assigned a column in the user subscription table 625 and subscription and user labeling information for the virtual stream is stored in this column.

Check marks in column 634 associated with stream 3 indicate which other users have subscribed to stream 3. In this example, user 2 (644) has subscribed to stream 3 and assigned the label "friends" to it. User 2 also has assigned the label "friends" to stream 5 (638), created by user 25. User 2 thereby created stream 4 (636), which has feed ID "User2:friends". Stream 4 (636) thus is a virtual stream comprising other virtual streams (stream 3 and stream 5), demonstrating that multiple levels of recursion are allowed for virtual streams. User 3 (646) has subscribed to stream 4 (636). If user 3 desired, he could label stream 4, thereby creating another virtual stream with an additional level of recursion, and another user could subscribe to that virtual stream.

Figure 7A:
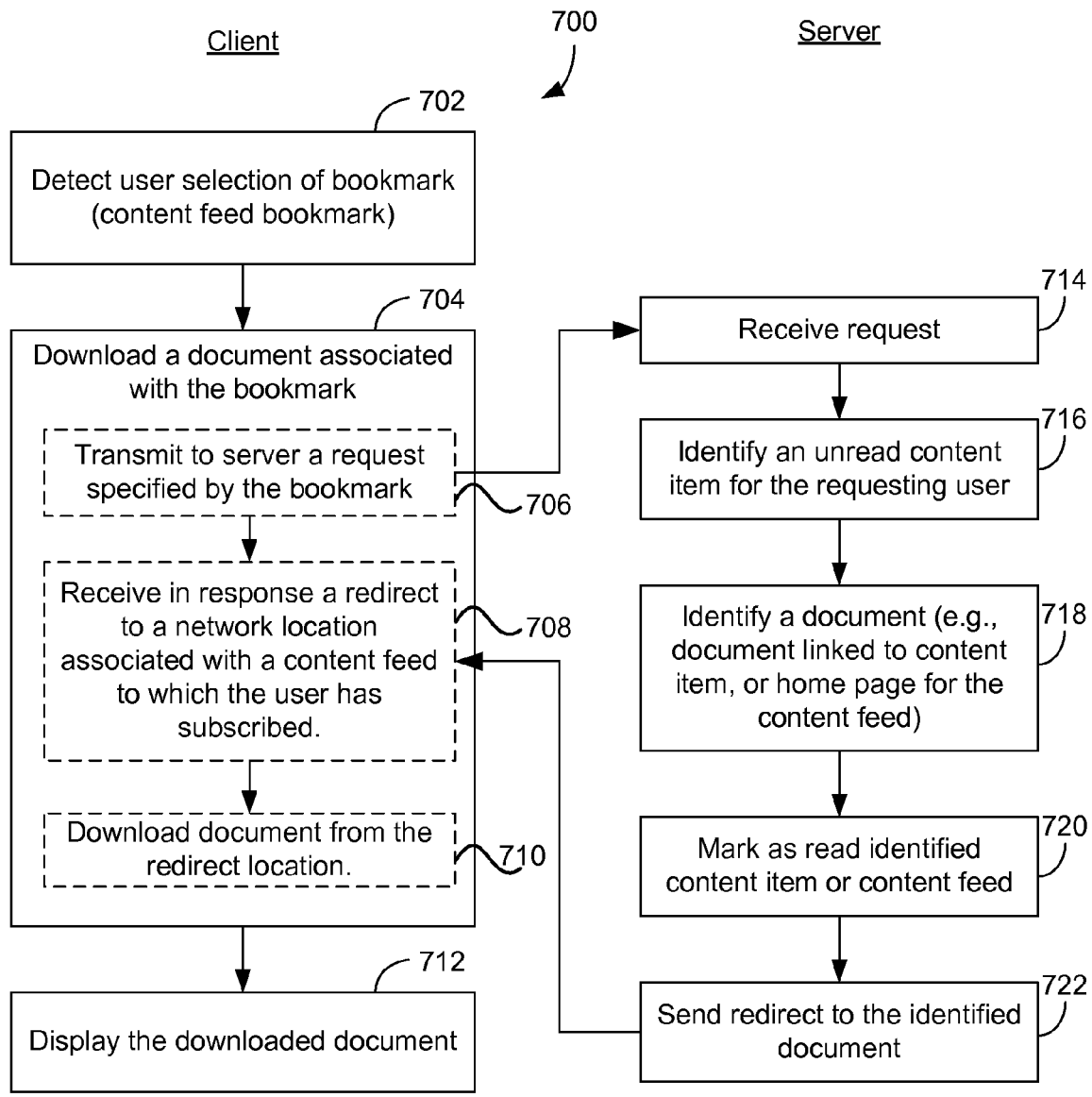
FIGS. 7A, 7B and 7C are flow diagrams illustrating a process for presenting content items to a user, in accordance with some embodiments.

FIG. 7A is a flow diagram illustrating a process 700 for presenting content items to a user, in accordance with some embodiments. Operations 702-712 are performed by client computer 400, while operations 714-722 are performed by server computer 500. Client 400 detects user selection of a bookmark (sometimes herein called a feed reader bookmark or content feed bookmark) (702). In response, client 400 downloads a document associated with the bookmark (704) and displays the downloaded document to the user (712).

In one embodiment, the process of downloading the document begins with transmitting to server 500 a request specified by the bookmark (706). As discussed in more detail below, in some embodiments, if the request is a valid request, it includes a token that uniquely corresponds to the user identifier of the requesting user, and a login cookie (also variously called an object, cookie file or cookie object) containing the requesting user's user identifier (sometimes called the user ID). Server 500 receives the request (714), identifies the user or user account of the user, and identifies an unread content item for the requesting user (716). Typically, in order for the server to successfully process the user's request, the requesting user must be a registered user of the content feed aggregation system, and must have subscribed to at least one content feed. The item identified by the server may, for example, be the most recent unread item in a set of content feeds associated with the selected bookmark. In another example, an unread item is identified according to other predefined selection criteria.

A document associated with the identified item is identified (718). Exemplary identified documents include a document corresponding to a URL in the identified content item, or the home page of a content feed containing the identified content item. For example, if the identified item is a blog posting, the identified document could be a web page containing the posting, or it may be the home page of the blog. If the identified item is a news article, the identified document could be a web page containing the article, or it may be the home page of a news service that published the article.

Server 500 marks the identified content item or a corresponding feed stream as read (720). In one embodiment, when the document identified in operation 718 is linked to a specific content item, the specific content item is marked as read. On the other hand, when the document identified in operation 718 is a home page for a content feed, the corresponding feed stream is marked as read, with a timestamp indicating the last time that the feed stream was marked as read. Marking an entire feed stream as read is equivalent (from the user's perspective) to marking all content items in the feed stream as having been read by the user, but is much more efficient because the only update made to the server's database is to update the "marked-as-read" flag and timestamp 668 in the user data for the feed stream (in the user subscription table 650). In contrast, marking as read all the individual items in the feed stream would potentially require updating the user data for many items in the feed content table 600. Once a feed stream has been marked as read for a particular user, only content items that are newer than the marked-as-read timestamp can be considered to be unread by the user (excluding, of course, any individual content items that have been marked as read).

Server 500 then sends client 400 a redirect to the identified document, or more specifically, to a network location associated with the document (722). Client 400 receives the redirect (708) and downloads the identified document from the redirect location (710). The downloaded document is displayed to the user (712).

Figure 7B:
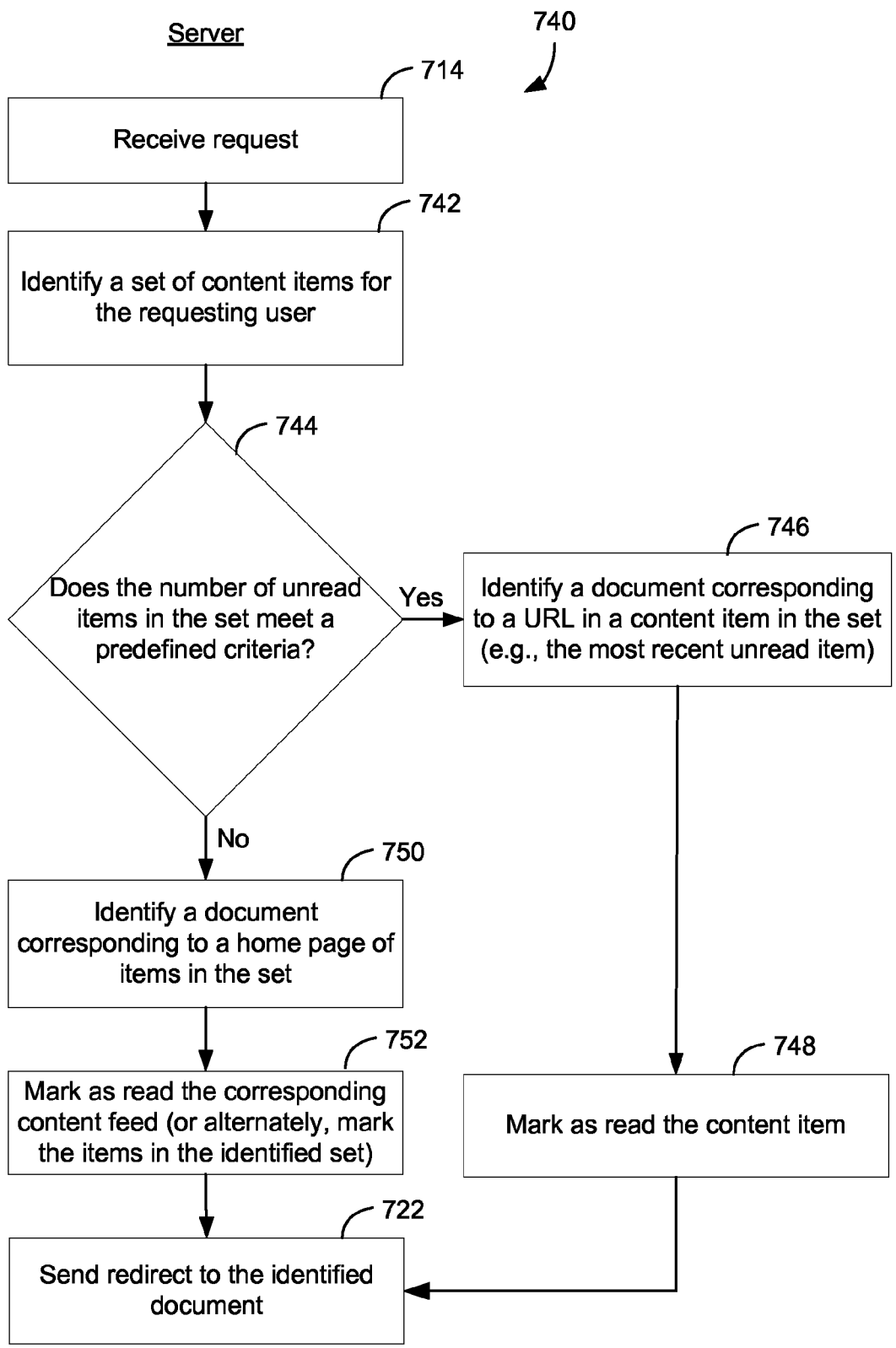

FIG. 7B is a flow diagram illustrating a process 740, performed by server computer 500, for identifying content to provide to a user, in response to user selection of a bookmark. For example, user selection of the bookmark may cause an HTTP request to be sent to the server and the URL may include one or more parameters. Server 500 receives a request specified by the bookmark (714). A set of content items associated with the bookmark request is identified (742). For example, the identified set of items could include items associated with a content feed to which the user has subscribed.

During operation 744, the number of unread items in the identified set of items is tested against predefined criteria. If the number of unread items meets the predefined criteria, a document corresponding to a URL in a content item in the set is identified (746). The item corresponding to the identified document is marked as read (748), and a redirect to the identified document is sent to client computer 400 (722). However, if the number of unread items does not meet the predefined criteria, a document corresponding to a home page of unread items in the set is identified (750). In addition, the content feed corresponding to the unread items is marked as read (752), and a redirect to the identified document is sent to the client computer (722). Alternately, all unread items in the set associated with the home page are marked as read (752), and a redirect to the identified document is sent to the client computer (722).

For example, consider a situation in which the most recent unread item from all the content feeds to which a user subscribes is a news article from a particular news provider. In response to user selection of a bookmark, server 500 receives a request specified by the bookmark (714) and identifies a set of items comprising the most recent unread item (the news article) and all other items provided by the same particular news provider (742). Now consider that the predefined criteria is whether the number or unread items in the set is less than ten. If the user's feed has less than ten unread items from the particular news provider, a web page containing the most recent unread item (the news article) will be identified (746), the item will be marked as read (748), and a redirect to the web page will be sent to client 400 (722). However, if the user's feed has ten or more unread items, a home page for the particular news provider will be identified (750), the feed stream associated with the particular news provider will be marked as read (752) (or, alternately, all the unread items in the feed stream will be marked as read), and a redirect to the home page will be sent to client 400 (722).

Figure 7C:
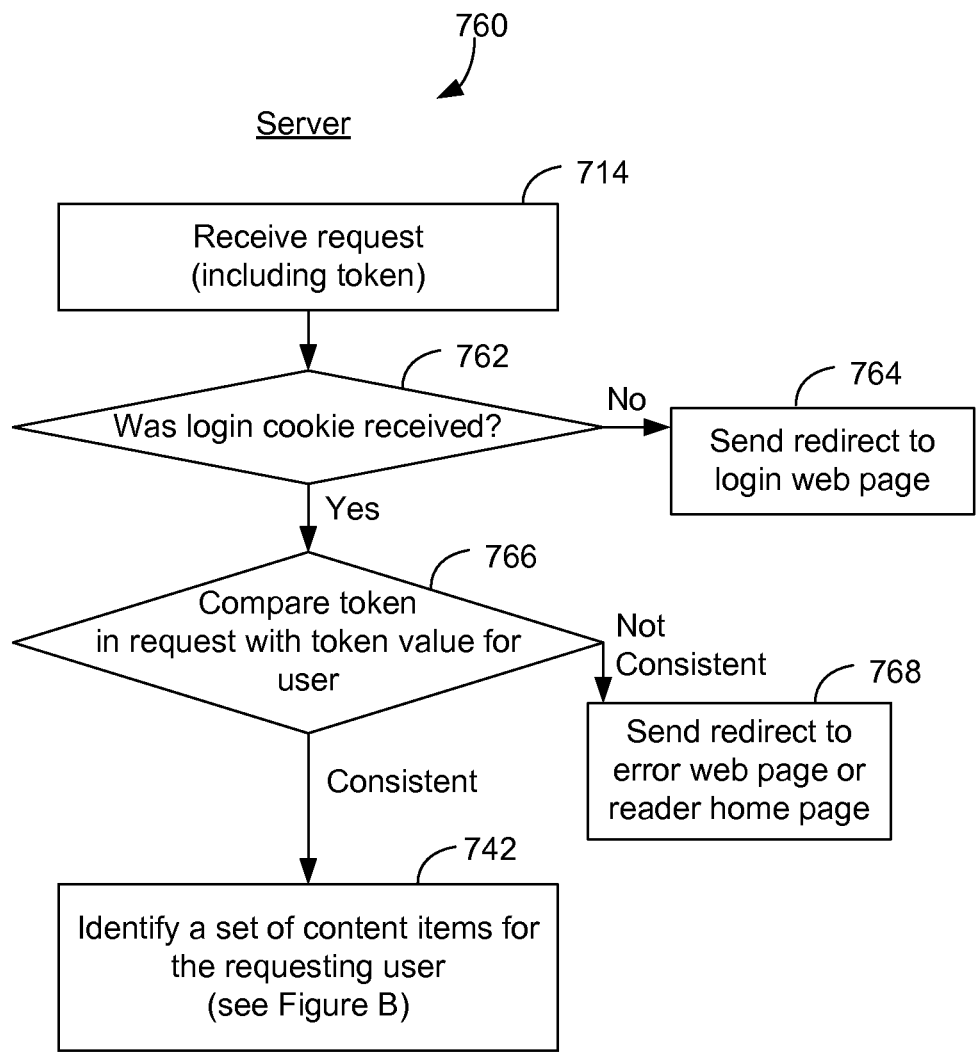

FIG. 7C is a flow diagram illustrating a process 760, performed by server computer 500, for receiving and verifying a request resulting from user selection of a bookmark. For security reasons, it is desirable to verify the request is, in fact, an authorized request from a respective user of the feed reader system before processing the request. In some embodiments, a valid request (702) initiated by user selection of the feed reader bookmark includes a token that uniquely corresponds to the user identifier of the requesting user, and a login cookie (also variously called an object, cookie file or cookie object) containing the requesting user's user ID. In one embodiment, the token is embedded as a parameter in the URL specified by the bookmark. The login cookie, if included in the request, is previously generated when the user logged in to the feed reader system or logged into a related system, such as a parent server system that provides a plurality of online services. It is noted that in the embodiments described here, the token and the user identifier are stored in separate objects (e.g., a bookmark and a cookie) so as to protect the integrity of the user's feed reader account. As will be described next, unless the user is in possession of both a login cookie and a bookmark having a token that corresponds to the user identifier in the cookie, the request generated by activating the bookmark will be rejected by the feed reader system.

Upon receiving a request (714), server 500 checks to see whether a login cookie, creating by previously logging in to the feed reader system, containing a user ID was received with the request (762). If no login cookie was received, server 500 sends client computer 400 a redirect to a login web page (764), from which the user may log in to the feed reader. Once the user has logged in to the feed reader, the user may select a bookmark and thereby initiate process 700 (FIG. 7A). If a login cookie was received, server 500 compares the token in the request to a stored token associated with the user (as identified by the user identifier in the login cookie), for example, token 688 stored in user preferences table 680. If the received token is consistent with the stored token, server 500 proceeds to identify a set of content items for the requesting user (742) and then perform the subsequent steps of process 740 (FIG. 7B), described above. However, if the received token is not consistent with the stored token, server 500 sends client 400 a redirect to, for example, a web page displaying an error message or a feed reader home page (768).

In some embodiments, a content feed bookmark functions as a link to a URL that corresponds to an online content feed aggregator. An example of a URL specified by a bookmark is:
  http://www.domain1.com/reader/
    bookmark?mode=nextitem&token=5782174&label=news
In this example, the value "5782174" in the URL is the token that uniquely corresponds to the user identifier of a user. The value shown for this token is merely illustrative; in practice, the number of digits of the token will be chosen based on cryptographic concerns. The parameters "mode=nextitem" and "label=news" specify that the document to be identified in step 718 of process 700 is the next unread item in News label 306. Different mode settings may be specified, for example, to specify that the item to be identified in step 718 is the home page of a content feed, or to invoke process 740 (FIG. 7B). If no label is specified, the document to be identified in response to selection of the bookmark may be provided by any content stream to which the user has subscribed.

Figure 8A:
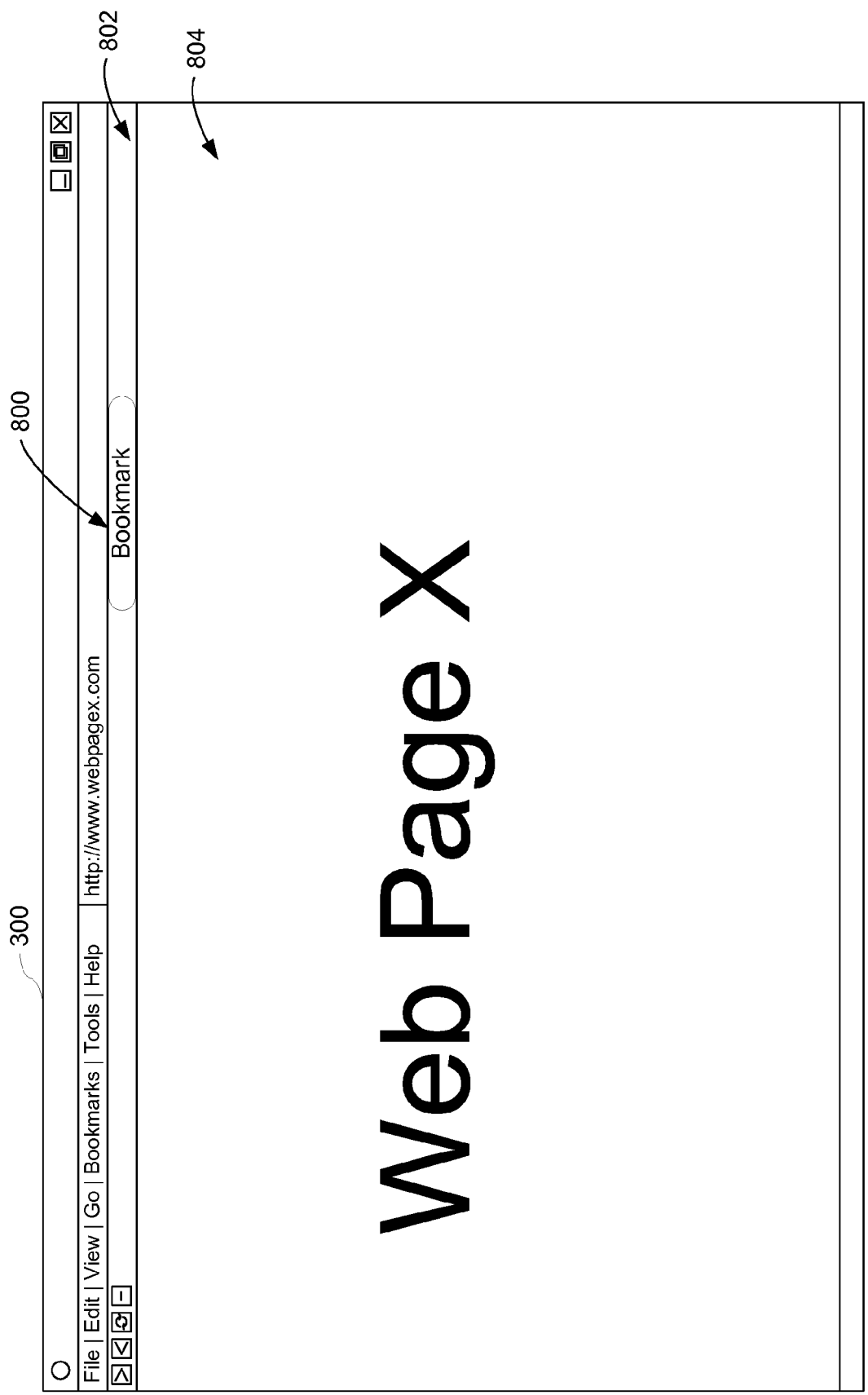
FIG. 8A is block diagram illustrating a feed reader user interface in accordance with some embodiments.

FIG. 8A is a schematic screenshot of a web browser 300 displaying a web page 804. Web browser 300 has a tool bar 802 containing a bookmark 800. Selecting bookmark 800, for example by clicking on it, initiates process 700, described with regards to FIG. 7A. Thus, instead of using a feed reader user interface such as the interface shown in FIG. 3A, a user may access feed reader content items simply by selecting bookmark 800.

Figure 8B:
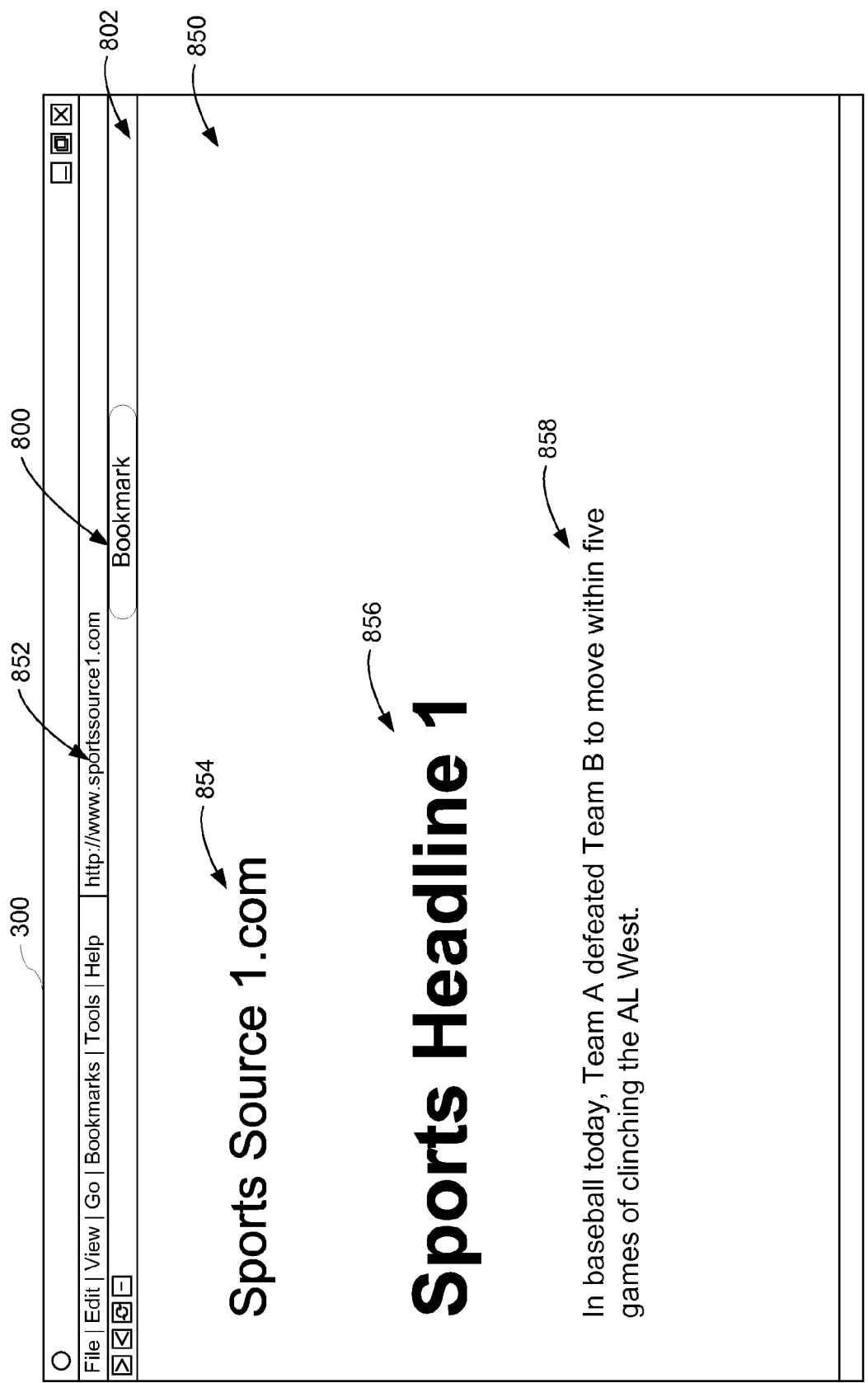
FIG. 8B is a block diagram illustrating a content item provided via the user interface of FIG. 8A, in accordance with some embodiments.

FIG. 8B is a schematic screenshot of a web browser 300 displaying a web page 850, in response to user selection of bookmark 800. In an embodiment, web page 850 corresponds to the most recent unread content item in the content feeds to which a user subscribes. Web page 850 is identified by a URL 852 corresponding to the source of the content item. In the example of FIG. 8B, web page 850 corresponds to content item 312 in FIG. 3A and content item 340 in FIG. 3B. In this example, web page 850 includes a source 854, a headline 856, and text 858, corresponding to the source, headline, and text of items 312 and 340. In another embodiment, web page 850 corresponds to an unread item identified according to other predefined selection criteria.

Figure 8C:
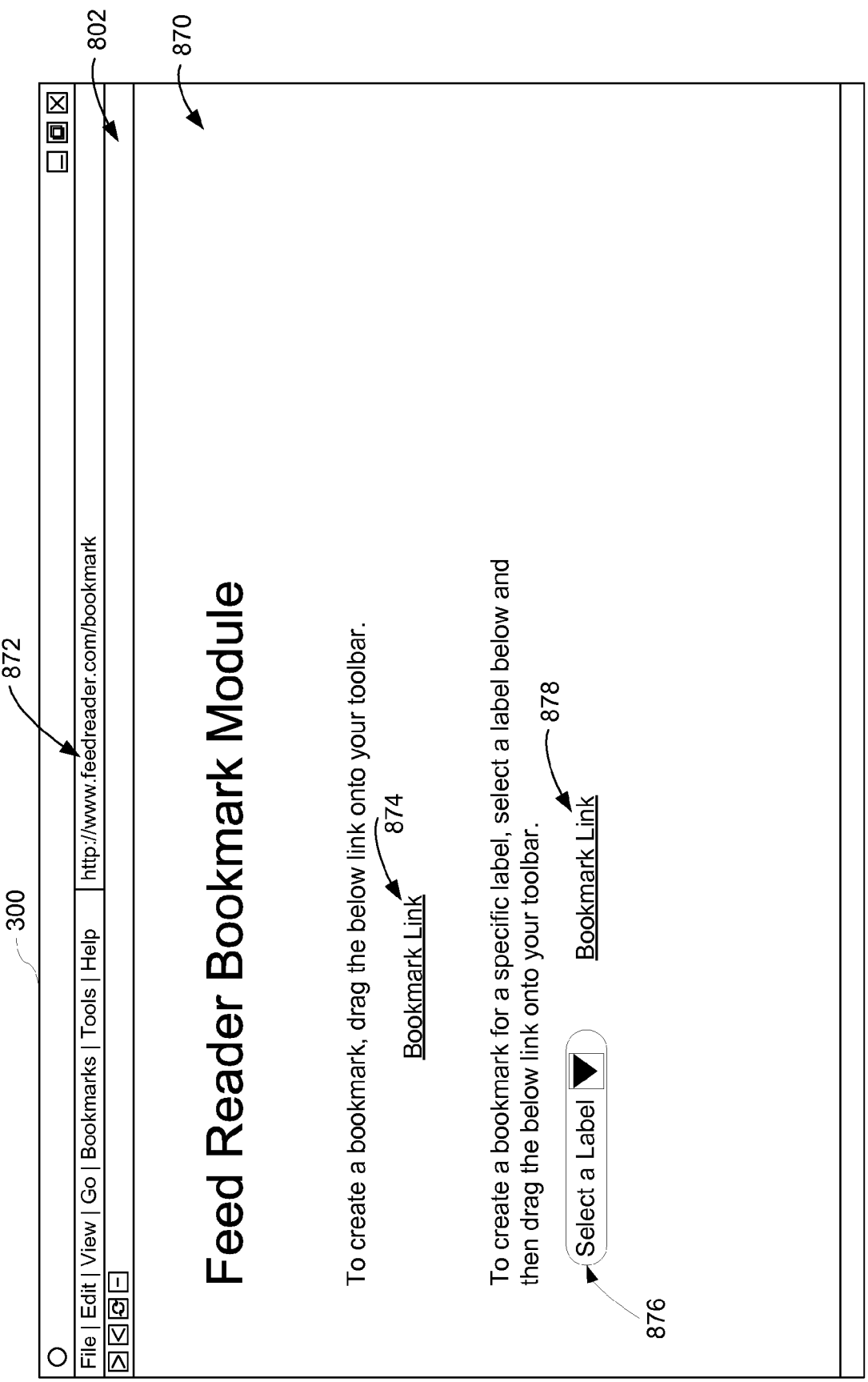
FIG. 8C is a block diagram illustrating a user interface for installing a bookmark on a browser toolbar, where the bookmark is for accessing one or more items of one or more content feeds to which the user has subscribed, in accordance with some embodiments.

FIG. 8C is a block diagram illustrating a user interface for installing a bookmark on a browser toolbar, where the bookmark is for accessing one or more items of one or more content feeds to which the user has subscribed, in accordance with some embodiments. Web browser 300 displays a web page 870, identified by a URL 872, that allows a user to create a bookmark on toolbar 802 of browser 300. Dragging bookmark link 874 onto toolbar 802 will create a bookmark 800 (see FIG. 8A). In some embodiments, selecting the bookmark created using bookmark link 874 will cause the browser to display the most recent unread content item from all of the content feeds to which a user subscribes. However, the user may prefer to create a bookmark for a specific label or folder in the user's feed reader account, by selecting a label from pull-down menu 876 and then dragging bookmark link 878 onto toolbar 802. In an embodiment, the resulting bookmark 800, when selected, will display the most recent unread content item in a set of content feeds associated with the selected label or folder. In other embodiments, other content items will be displayed in accordance with predefined selection criteria.

Figure 9A:
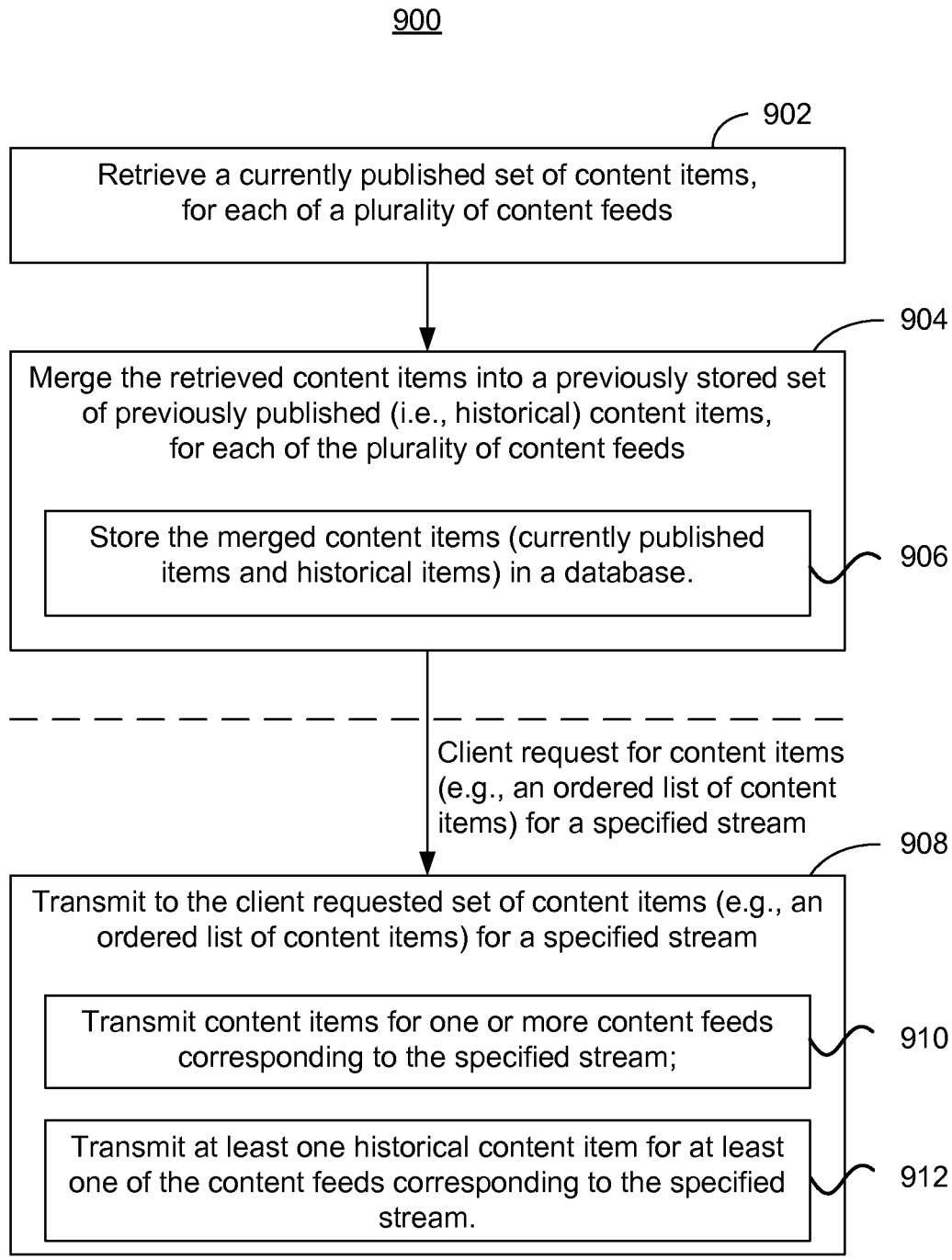
FIG. 9A is a flow diagram illustrating a process for retrieving and storing content items, in accordance with some embodiments.

FIG. 9A is a flow diagram illustrating a process 900 for retrieving and storing content items for subsequent transmission to client computer 400, in accordance with some embodiments. Server computer 500 retrieves a currently published set of content items for a content feed, for each of a plurality of respective content feeds (902). Step 902 is performed, for example, by feed tracker module 516 (FIG. 5). The retrieved content items are merged into a previously stored set of previously published content items, otherwise known as historical content items, for each of the plurality of content feeds (904). Currently published content items are available from respective publication sources at well-defined network locations, while historical content items were previously available from the respective publication sources, but are no longer available. The merged content items are stored in a database (906), such as feed content database 520 (FIG. 5).

In an embodiment, an XML file containing a currently published set of content items for a content feed is parsed by item. Each content item includes a title, date, and text context. Some items also include a link, such as a URL associated with the item, or an ID assigned by the feed publisher (herein called the "publisher-assigned ID"). For each item in the XML file, server computer 500 computes an identifier (sometimes called the content ID) and a content fingerprint. For example, the identifier may be a 64-bit number based on the URL of the corresponding content feed and either the publisher-assigned ID, the item's link, or the item's title, in that order of preference, depending on which information is available. In an embodiment, a hash function is applied to this information to produce the identifier. In one embodiment, the identifier is a 64-bit value, but may be a longer value in other implementations to further reduce the chance of a collision between two distinct content items. In some embodiments, the content fingerprint or a respective content item is generated by applying a hash function to the entire content of the content item, and the web page or document, if any, referenced by the content item (e.g., referenced by a URL or publisher-assigned ID in the content item).

Server computer 500 compares each identifier against the content ID's 612 of feed content table 600 (FIG. 6A) stored in feed content database 520 (FIG. 5). If an identifier does not match any of the stored content ID's, the corresponding content item is inserted into database 520, along with its fingerprint. If the identifier does match a stored content ID, then server 500 compares the content fingerprint of the corresponding item to the content fingerprint of the stored item (see, for example, content fingerprint 617 in FIG. 6A). If the content has not changed, the corresponding item is not inserted into database 520. However, if the content has changed, the corresponding item is inserted into database 520 along with its content ID and fingerprint. In some embodiments, this is accomplished by replacing the previously stored content item that matches the content ID of the new content item. In another embodiment, the new content items is added to the database 520 without replacing or deleting the previously stored content item that matches the fingerprint of the new content item.

In response to a request from client computer 400, server computer 500 transmits to client computer 400 an ordered list of content items for a specified stream (908). The specified stream may correspond to a particular content feed (i.e., may correspond to a particular publication source at a well-defined network location) or may be a virtual stream derived from one or more other content streams within the context of server system 104. Therefore, the transmitted ordered list of content items contains items from one or more content feeds corresponding to the specified stream (910). The transmitted ordered list of content items also may include at least one historical item for at least one of the content feeds corresponding to the specified stream (912). In an embodiment, the list is ordered by time, based on timestamps associated with the content items. Alternately, the list may be ordered based on other predefined selection criteria (e.g., a predefined scoring function of the content and the timestamps of the content items).

Figure 9B:
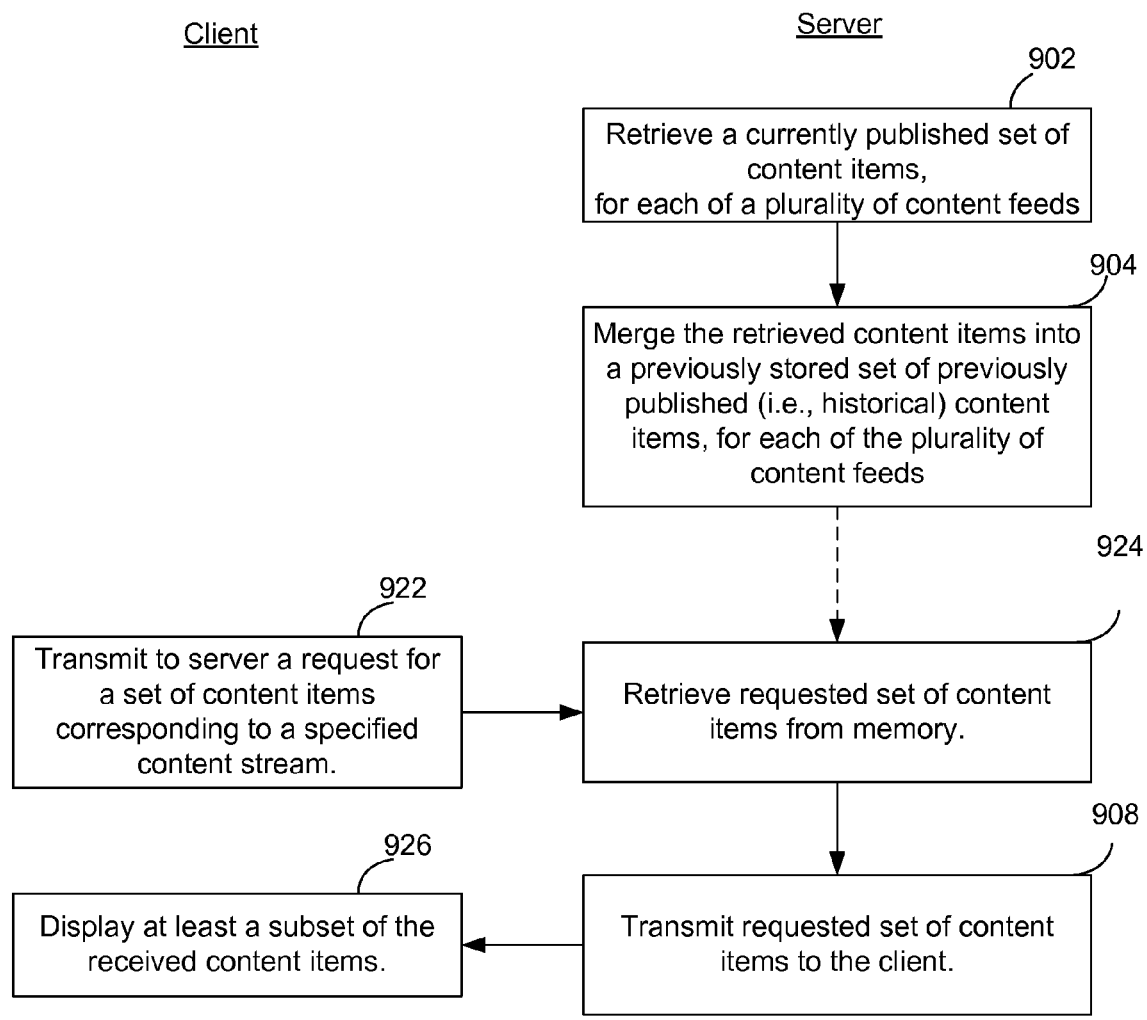
FIGS. 9B and 9C are flow diagrams illustrating processes for presenting content items to a user, in accordance with some embodiments.

FIG. 9B is a flow diagram illustrating a process 920 for presenting an ordered list of content items to a user, in accordance with some embodiments. Server computer 500 retrieves and stores content items as described above with regard to FIG. 9A (902, 904). In response to a user action, client computer 400 transmits to server computer 500 a request for a set of content items corresponding to a specified stream (922). Examples of user actions prompting this request may include selecting a label, for example by clicking on a label listed under "Your Subscriptions" 305 in FIG. 3A, or scrolling through a list of content items such as list 310 in FIG. 3A. Server computer 500 receives the request and retrieves the requested set of content items from server memory 504 (924) and responds by transmitting a set (e.g., an ordered list) of content items for a specified stream (908). Client computer 400 receives the transmitted set of content items and displays at least a subset of the content items to the user (926). Examples of displayed sets of content items include lists 310 in FIGS. 3A-3D.

Figure 9C:
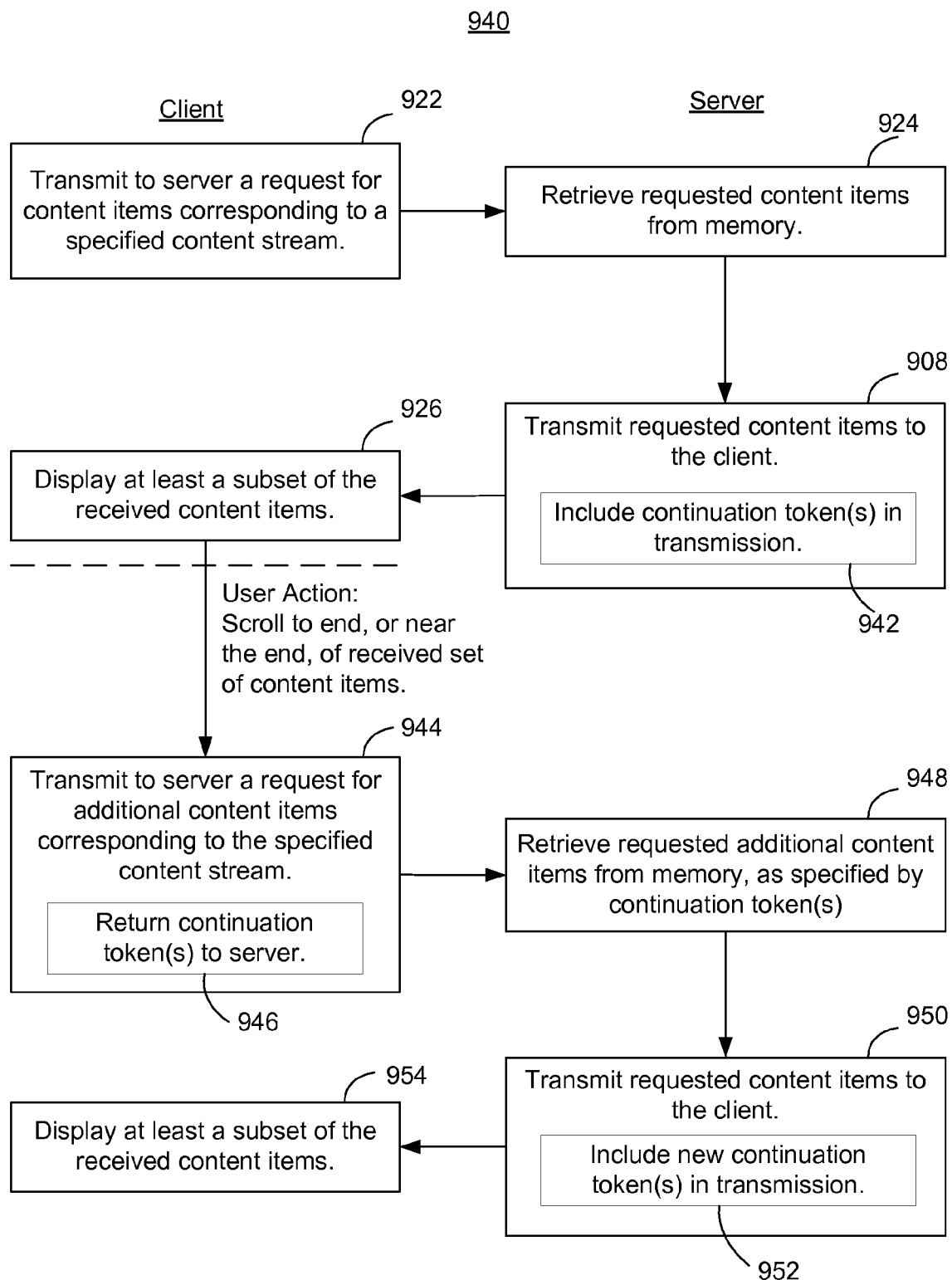

FIG. 9C is a flow diagram illustrating a process 940 for presenting an ordered list of content items to a user, in accordance with some embodiments. A request from client computer 400 (922) prompts server computer 500 to retrieve and transmit a set (e.g., an ordered list) of content items corresponding to a specified stream (924, 908), as described above with regards to FIG. 9B. In some embodiments, transmission 908 includes one or more continuation tokens for enabling subsequent requests for additional content items corresponding to the specified stream (942). Continuation tokens contain sufficient information to allow server computer 500 to resume its ordered retrieval in response to a subsequent request from client computer 400. For example, where the requested set of content items is ordered by time and is associated with a particular content feed, transmission 908 includes a continuation token containing the timestamp of the next item in the particular content feed to be retrieved (or the timestamp of the last item sent to the client) and transmitted in response to a subsequent request. In other words, if a request 922 is for the twenty most recent unread items in a particular feed, the continuation token returned along with the results of the request contains the timestamp of the twenty-first most recent unread item in the feed. In another example, where the requested set of content items is ordered by time and is associated with a plurality of respective content feeds, transmission 908 may contain multiple continuation tokens, each corresponding to a respective content feed. In yet another example, where the requested set of content items is arranged according to some other predefined criteria, the continuation token(s) may contain a parameter specifying the predefined criteria (e.g., one of a small number of predefined options) and another parameter specifying the depth of a next item to be retrieved (or the depth of the last item previously retrieved) after applying the criteria to content items in the specified stream.

A user viewing the displayed list of content items (926) may attempt to scroll beyond the end of the displayed list. This action by the user will prompt client computer 400 to fetch from server computer 500 an additional set of content items, corresponding to the specified stream, to display to the user. In some embodiments, when the user scrolls within a predefined number (e.g., a number between five and fifteen, inclusive) of content items of the end of the displayed list, client computer 400 fetches additional items from the server. Specifically, client computer 400 transmits to server computer 500 a request for addition content items (944). The request includes one or more continuation token(s) previously transmitted to client computer 400 in step 942 (946). Server computer 500 uses the returned continuation token(s) to retrieve the requested additional content items from server memory 504 (948). For example, where the second request is for the next N (e.g., twenty) unread items for the specified stream, the request sent by the client computer 400 includes a continuation token containing the timestamp of the first content item in the specified stream that follows the last content item (of the same specified stream) previously sent to the client computer. Server computer 500 will retrieve twenty items from the specified stream, starting with the one identified by the continuation token in the request. In another example, where the request is for the next twenty unread items for a particular feed, ranked according to predefined criteria, client computer 400 returns a continuation token containing a parameter specifying the predefined criteria and one or more parameters that specify either the number of items previously retrieved and transmitted in response to previous requests, or the depth of the next item to be retrieved and transmitted to the client computer. Server computer 500 ranks the content items corresponding to the specified feed according to the criteria stated in the continuation token and retrieves from memory 504 the requested number of content items starting at the specified depth in the ranking.

Content items retrieved in accordance with the returned continuation token(s) are transmitted to client computer 400 (950), and at least a subset of those content items are displayed to the user (954). For example, the client computer may simultaneously display some of the previously received content items and some of the newly received content items. Transmission 950 includes new continuation token(s) that may be returned in subsequent requests for content items (952), according to the process described above.

Figure 10A:
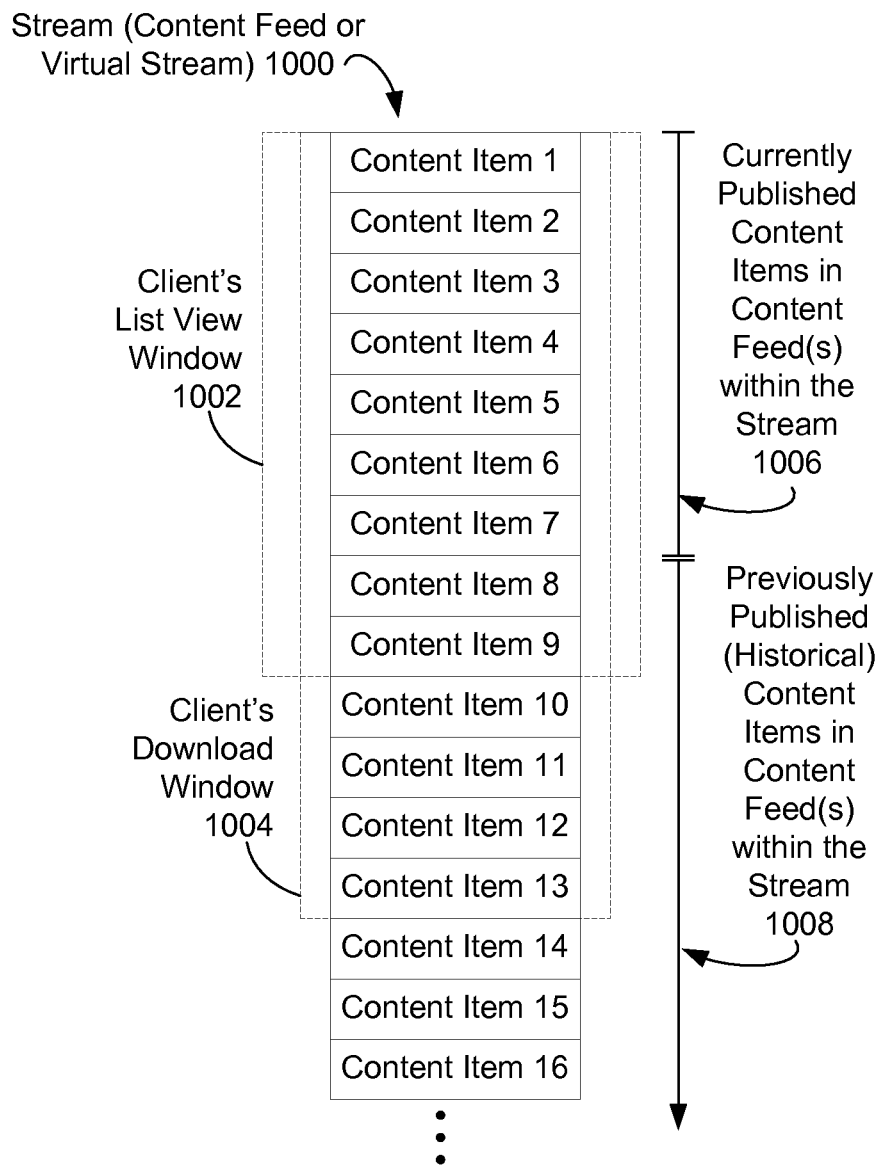
FIGS. 10A and 10B are block diagrams illustrating a list of content items corresponding to a stream, in accordance with some embodiments.

FIG. 10A is a block diagram illustrating a list of content items corresponding to a stream 1000, in accordance with some embodiments. Stream 1000 may correspond to a particular content feed or may be a virtual stream. Content items are stored in memory 504 of server computer 500, for example in content item database 524 (FIG. 5). The content items are ordered by time, such that content item 1 is the most recent item in the stream. The content items include currently published content items 1006 and previously published content items, or historical content items, 1008. Currently published content items 1006 are available from respective publication sources at well-defined network locations, while historical content items 1008 are no longer available from the respective publication sources. In the example of FIG. 10A, content items 1-7 are currently published, while content item 8 and all subsequent content items are historical.

In response to a request 922 (FIG. 9B) from client computer 400, an ordered list (or, more generally, a set) of items corresponding to stream 1000 is transmitted to client computer 400. The transmitted ordered list contains a specified number of items, referred to as client's download window 1004. In the example of FIG. 10A, client's download window 1004 includes 13 items, meaning that the ordered list transmitted to client computer 400 includes 13 items. In this example, the 13 transmitted items include 7 currently published items and 6 historical items. At least a subset of the transmitted ordered list is displayed to the user (926; see FIG. 9B), as determined by the size of client's list view window 1002. In the example of FIG. 10A, client's list view window 1002 includes 9 items, meaning that 9 items are displayed to the user via the feed reader user interface. Examples of formats for displaying items are shown in FIGS. 3A-3D. In general, the size of client's list view window 1002 will vary depending on the space required to display transmitted content items.

Figure 10B:
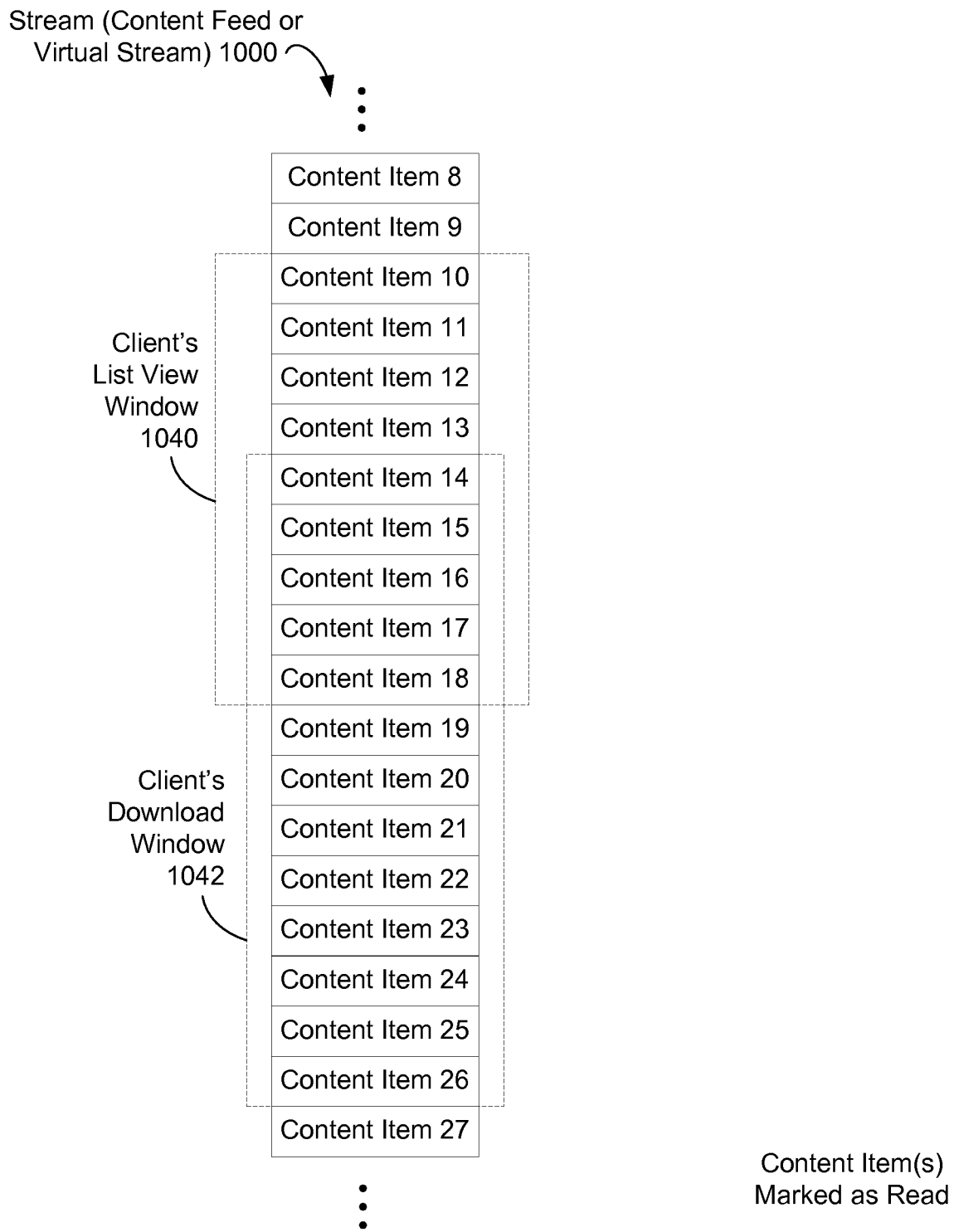

FIG. 10B is a block diagram illustrating content items in stream 1000 to be transmitted and displayed in response to a second request from client computer 400 following the initial request described with regards to FIG. 10A. Client computer 400 generates the second request in response to a user action, such as scrolling through a list of content items, such as list 310 in FIG. 3A. In response to the second request, server computer 500 identifies a next set of untransmitted content items in stream 1000, where the number of identified content items is determined by the client's download window 1042. In the example of FIG. 10B, client's download window 1042 includes 13 items. Since content items 1-13 previously were transmitted in response to the first request, server computer 500 identifies content items 14-26 and transmits an ordered list of those items to client computer 400.

The items actually displayed to a user in response to the second request depend on the action taken by the user. In the example of FIG. 10B, the user has scrolled past the entire list of content items originally displayed in client's list view window 1002 (FIG. 10A). Therefore, in this example, client's list view window 1040 now displays content items 10-18. In general, which content items are displayed will depend on the manner in which the user scrolls through the displayed list and the size of the displayed items. The displayed list may include content items retrieved via multiple requests. For example, in FIG. 10B, displayed content items 10-13 were retrieved in response to the first request, as part of download window 1004 (FIG. 10A), while displayed content items 14-18 were retrieved in response to the second request, as part of download window 1042. However, all nine content items are displayed to the user in a seamless list.

FIG. 11 is a flow diagram illustrating a distributed process 1100 for recursively defining streams of content items, in accordance with some embodiments. FIG. 11 shows operations at three client devices (Client1, Client2, Client3), performed in response to instructions or commands from three respective users (User1, User2, User3). The corresponding operations at the server system are discussed above with reference to FIG. 6D. At a first client device, Client1, in response to instructions or commands from a first user, User1, the first client device applies a first label (e.g., Label1) to one or more user-selected or user-specified content feeds (1102). If the labeled set of user-specified content feeds is made available for subscription by other users, the labeled set of user-specified content feeds becomes a virtual stream that is assigned a stream identifier, such as "User1:Label1". This virtual stream is assigned a column in the user subscription table 625 (FIG. 6D) and subscription and user labeling information for the virtual stream is stored in this column.

Similarly, at a second client device, Client2, in response to instructions or commands from a second user, User2, the second client device applies a second label (e.g., Label2) to one or more user-selected or user-specified content feeds (1104). If the labeled set of user-specified content feeds is made available for subscription by other users, the labeled set of user-specified content feeds becomes a virtual stream that is assigned a stream identifier, such as "User2:Label2". This virtual stream is assigned a column in the user subscription table 625 (FIG. 6D) and subscription and user labeling information for the virtual stream is stored in this column.

At a third client device, Client3, in response to instructions or commands from a third user, User3, the third client device applies a third label (e.g., Label3) to the first and second streams (106). The resulting set of labeled streams becomes a third stream if the set of labeled streams is made available for subscription by others. When the user selects the third label, which may be represented as a folder name, content items for the third stream are presented to the third user (1108). In addition, in some embodiments the names of the labeled streams (e.g., User1:Label1 and User2:Label2) are presented to the third user (1110). For example, the names of the labeled streams may be shown in a subscription list at one side of the GUI or window in which content items of the third stream are displayed.

Additional users (e.g., a fourth user at a fourth client device) may subscribe to the third stream, and thus the process of recursive stream definitions may continue at the client devices of those additional users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of providing content, comprising:
at a first client device, in response to instructions from a first user, applying a first label to a first stream of content feeds, the first stream comprising a second stream of content feeds and a third stream of content feeds, the second stream of content feeds comprising one or more content feeds to which a second client device in response to instructions from a second user applied a second label, the third stream of content feeds comprising one or more content feeds to which a third client device in response to instructions from a third user applied a third label, wherein the first, second and third labels are distinct from each other, and the first, second and third users are distinct from each other; and
at the first client device, presenting to the first user a sequence of content items for the first stream of content feeds, the sequence comprising content items from the second stream of content feeds and the third stream of content feeds.

2. The method of claim 1, further including, at the first client device, presenting to the first user a stream identifier for the second stream and a stream identifier for the third stream, the stream identifier for the second stream including a name of a second user and the second label, the stream identifier for the third stream including a name of a third user and the third label.

3. The method of claim 1, further including, at a fourth client device, subscribing to the first stream in response to instructions from a fourth user, and presenting to the fourth user content items for the first stream.

4. The method of claim 1, further including, at the first client device, in response to instructions from the first user, performing an action to make the first stream available for subscription by other users.

5. A method of serving content items from content feeds to a plurality of users, comprising:
at a server system:
for each respective stream of content feeds of a plurality of streams of content feeds, storing subscription data indicating users of the plurality of users who have subscribed to the respective stream of content feeds, and storing user label data indicating labels, if any, that respective users have applied to the respective stream of content feeds, wherein a first stream of content feeds of the plurality of streams of content feeds, subscribed to by a first user, has a first label applied in response to instructions from the first user and comprises a second stream of content feeds having a second label applied in response to instructions from a second user and a third stream of content feeds having a third label applied in response to instructions from a third user, wherein the second stream of content feeds and the third stream of content feeds each comprise one or more content feeds, and wherein each content feed comprises a set of content items published by a respective publication source, wherein the first, second and third labels are distinct from each other, and the first, second and third users are distinct from each other; and
transmitting to a client device of the first user a list of content items of the first stream of content feeds.

6. The method of claim 5, including storing for the first stream a stream name that includes a name of the first user and the label applied by the first user.

7. The method of claim 5, wherein the second stream and the third stream each comprise two or more content feeds, wherein each content feed comprises a set of content items published by a respective publication source.

8. The method of claim 5, further including, at the server system, in response to instructions from the first user, performing an action to make the first stream available for subscription by other users.

9. A system for serving content, located remotely from a client device, comprising:
one or more processors; and
memory storing one or more programs configured for execution by the one or more processors, the one or more programs including:
instructions to store, for each respective stream of content feeds of a plurality of streams of content feeds, subscription data indicating users of a plurality of users who have subscribed to the respective stream of content feeds, and to store user label data indicating labels, if any, that respective users have applied to the respective stream of content feeds, wherein a first stream of content feeds of the plurality of streams of content feeds, subscribed to by a first user, has a first label applied in response to instructions from the first user and comprises a second stream of content feeds having a second label applied in response to instructions from a second user and a third stream of content feeds having a third label applied in response to instructions from a third user, wherein the second stream of content feeds and the third stream of content feeds each comprise one or more content feeds, wherein each content feed comprises a set of content items published by a respective publication source, and wherein the first, second and third labels are distinct from each other, and the first, second and third users are distinct from each other; and
instructions to transmit to a client device of the first user a list of content items of the first stream of content feeds.

10. The system of claim 9, the one or more programs including instructions to store for the first stream a stream name that includes a name of the first user and the label applied by the first user.

11. The system of claim 9, wherein the second stream and the third stream each comprise two or more content feeds, wherein each content feed comprises a set of content items published by a respective publication source.

12. The system of claim 9, the one or more programs including further including instructions to perform an action to make the first stream available for subscription by other users, in response to instructions from the first user.

13. A non-transitory computer readable storage medium storing one or more programs configured to be executed by a server computer system remotely located from a client device, the one or more programs comprising:
instructions to store, for each respective stream of content feeds of a plurality of streams of content feeds, subscription data indicating users of a plurality of users who have subscribed to the respective stream of content feeds, and to store user label data indicating labels, if any, that respective users have applied to the respective stream of content feeds, wherein a first stream of content feeds of the plurality of streams of content feeds, subscribed to by a first user, has a first label applied in response to instructions from the first user and comprises a second stream of content feeds having a second label applied in response to instructions from a second user and a third stream of content feeds having a third label applied in response to instructions from a third user, wherein the second stream of content feeds and the third stream of content feeds each comprise one or more content feeds, wherein each content feed comprises a set of content items published by a respective publication source, and wherein the first, second and third labels are distinct from each other, and the first, second and third users are distinct from each other; and instructions to transmit to a client device of the first user a list of content items of the first stream of content feeds.

14. The non-transitory computer readable storage medium of claim 13, the one or more programs including instructions to store for the first stream a stream name that includes a name of the first user and the label applied by the first user.

15. The non-transitory computer readable storage medium of claim 13, wherein the second stream and the third stream each comprise two or more content feeds, wherein each content feed comprises a set of content items published by a respective publication source.

16. The non-transitory computer readable storage medium of claim 13, the one or more programs further including instructions to perform an action to make the first stream available for subscription by other users, in response to instructions from the first user.

17. A server system for serving content, located remotely from a client device, comprising:
one or more processors;
memory storing one or more programs for execution by the one or more processors;
means for storing, for each respective stream of content feeds of a plurality of streams of content feeds, subscription data indicating users of a plurality of users who have subscribed to the respective stream of content feeds, and for storing user label data indicating labels, if any, that respective users have applied to the respective stream of content feeds, wherein a first stream of content feeds of the plurality of streams of content feeds, subscribed to by a first user, has a first label applied in response to instructions from the first user and comprises a second stream of content feeds having a second label applied in response to instructions from a second user and a third stream of content feeds having a third label applied in response to instructions from a third user, wherein the second stream of content feeds and the third stream of content feeds each comprise one or more content feeds, wherein each content feed comprises a set of content items published by a respective publication source, and wherein the first, second and third labels are distinct from each other, and the first, second and third users are distinct from each other; and
means for transmitting to a client device of the first user a list of content items of the first stream of content feeds.

18. A client device, comprising:
one or more processors; and
memory storing one or more programs configured for execution by the one or more processors, the one or more programs including:
instructions to apply a first label to a first stream of content feeds, in response to instructions from a first user at the client device, the client device comprising a first client device, the first stream comprising a second stream of content feeds and a third stream of content feeds, the second stream of content feeds comprising one or more content feeds to which a second client device in response to instructions from a second user applied a second label, the third stream of content feeds comprising one or more content feeds to which a third client device in response to instructions from a third user applied a third label, wherein the first, second and third labels are distinct from each other, and the first, second and third users are distinct from each other; and
instructions to present to the first user, at the first client device, a sequence of content items for the first stream of content feeds, the sequence comprising content items from the second stream of content feeds and the third stream of content feeds.

19. The client device of claim 18, the one or more programs further including instructions for presenting to the first user, at the first client device, a stream identifier for the second stream and a stream identifier for the third stream, the stream identifier for the second stream including a name of a second user and the second label, the stream identifier for the third stream including a name of a third user and the third label.

20. The client device of claim 18, the one or more programs further including, instructions for performing an action to make the first stream available for subscription by other users, in response to instructions from the first user at the first client device.

21. A non-transitory computer readable storage medium storing one or more programs configured to be executed at a client device, the one or more programs comprising:
instructions to apply a first label to a first stream of content feeds, in response to instructions from a first user at the client device, the client device comprising a first client device, the first stream comprising a second stream of content feeds and a third stream of content feeds, the second stream of content feeds comprising one or more content feeds to which a second client device in response to instructions from a second user applied a second label, the third stream of content feeds comprising one or more content feeds to which a third client device in response to instructions from a third user applied a third label, wherein the first, second and third labels are distinct from each other, and the first, second and third users are distinct from each other; and
instructions to present to the first user, at the first client device, a sequence of content items for the first stream of content feeds, the sequence comprising content items from the second stream of content feeds and the third stream of content feeds.

22. The non-transitory computer readable storage medium of claim 21, the one or more programs further including instructions for presenting to the first user, at the first client device, a stream identifier for the second stream and a stream identifier for the third stream, the stream identifier for the second stream including a name of a second user and the second label, the stream identifier for the third stream including a name of a third user and the third label.

23. The non-transitory computer readable storage medium of claim 21, the one or more programs further including, instructions for performing an action to make the first stream available for subscription by other users, in response to instructions from the first user at the first client device.

* * * * *